US007634625B2

(12) United States Patent
Otani et al.

(10) Patent No.: US 7,634,625 B2
(45) Date of Patent: Dec. 15, 2009

(54) STORAGE SYSTEM AND METHOD FOR COPYING VOLUMES BY INSPECTION OF DATA SECURITY

(75) Inventors: Toshio Otani, Kawasaki (JP); Naoko Iwami, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 421 days.

(21) Appl. No.: 10/974,457

(22) Filed: Oct. 26, 2004

(65) Prior Publication Data

US 2006/0047929 A1 Mar. 2, 2006

(30) Foreign Application Priority Data

Sep. 2, 2004 (JP) ............................. 2004-255143

(51) Int. Cl.
*G06F 12/00* (2006.01)
(52) U.S. Cl. ..................................... 711/161; 711/162
(58) Field of Classification Search ................. 711/161, 711/162
See application file for complete search history.

(56) References Cited

U.S. PATENT DOCUMENTS 5,943,688 A * 8/1999 Fisher et al. ................ 711/162

| 2003/0028729 | A1* | 2/2003 | Yamamoto et al. | 711/130 |
| 2003/0154412 | A1* | 8/2003 | Hetzler et al. | 713/202 |
| 2004/0010732 | A1 | 1/2004 | Oka | |
| 2004/0093443 | A1* | 5/2004 | Lee et al. | 710/53 |
| 2005/0091533 | A1* | 4/2005 | Omote et al. | 713/201 |

OTHER PUBLICATIONS

Kyas *Internet Security*, Coriolis Group, pp. 119 and 198-199 (Jan. 1997).

* cited by examiner

*Primary Examiner*—Gary J Portka
*Assistant Examiner*—Yong J. Choe
(74) *Attorney, Agent, or Firm*—Townsend and Townsend and Crew LLP

(57) ABSTRACT

A storage network system includes a storage device including a volume for recording data, and a network connection device, and a host including a device for reading/writing data from/into the volume through a network. The host includes a security inspection program for performing security inspection of data communicated through a network and generating an inspection log including a result of the security inspection, inspection log acquisition means for acquiring the inspection log generated by the security inspection program whenever occasion demands, and copy command issuing means for issuing a copy command to copy data from the volume to another volume when there is no abnormality in the content of the inspection log concerning the volume.

16 Claims, 19 Drawing Sheets

| iSCSI INITIATOR NAME | iSCSI TARGET NAME | LUN |
|---|---|---|
| iqn.a.com:hst1 | iqn.a.com:str1 | 0 |
| iqn.a.com:hst1 | iqn.a.com:str1 | 7 |
| iqn.a.com:hst2 | iqn.a.com:str1 | 8 |

| iSCSI TARGET NAME | LUN | CONTENT OF PROCESSING |
|---|---|---|
| iqn.a.com:str1 | 0 | MAKE A NEW-LEVEL BACKUP VOLUME |

| iSCSI TARGET NAME | LUN | CONTENT OF PROCESSING |
|---|---|---|
| iqn.a.com:str1 | 0 | RESTORE |

FIG. 8

| COPY SOURCE VOLUME | | COPY DESTINATION VOLUME | | BACKUP-MAKING TIME |
|---|---|---|---|---|
| iSCSI TARGET NAME | LUN | iSCSI TARGET NAME | LUN | |
| iqn.a.com:str1 | 0 | iqn.a.com:str1 | 1 | 2004/06/21 00:00 |
| iqn.a.com:str1 | 0 | iqn.a.com:str1 | 2 | 2004/06/21 00:05 |
| iqn.a.com:str1 | 0 | iqn.a.com:str1 | 3 | 2004/06/21 00:10 |

| FILE NAME | INSPECTION RESULT | iSCSI INITIATOR NAME | iSCSI TARGET NAME | LUN |
|---|---|---|---|---|
| /data/html/index.html | ABNORMAL | iqn.a.com:hst1 | iqn.a.com:str1 | 0 |

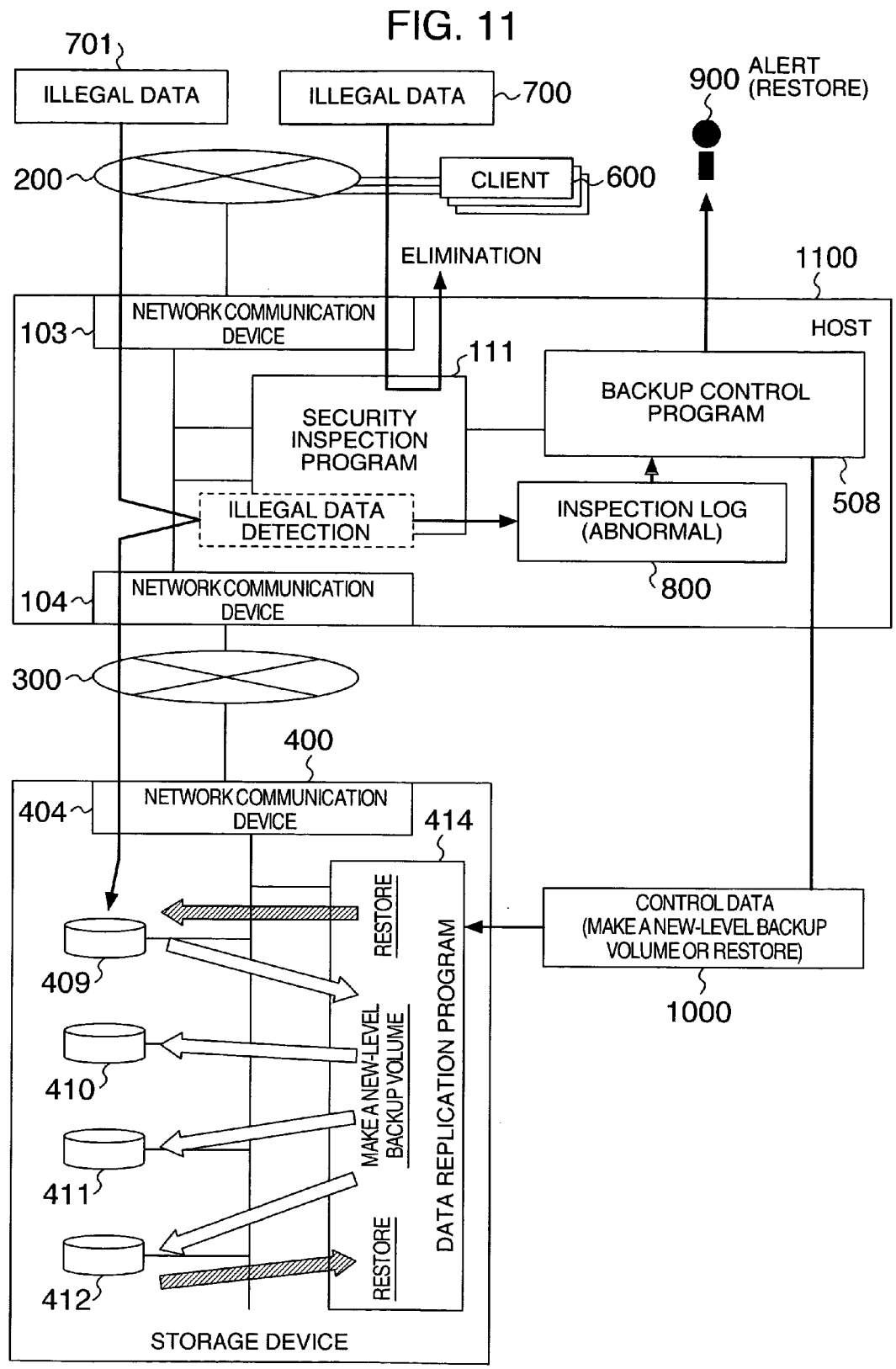

FIG. 22

| COPY SOURCE VOLUME | | COPY DESTINATION VOLUME | | BACKUP-MAKING TIME |
|---|---|---|---|---|
| iSCSI TARGET NAME | LUN | iSCSI TARGET NAME | LUN | |
| iqn.a.com:str2 | 0 | iqn.a.com:str2 | 1 | 2004/06/21 00:00 |
| iqn.a.com:str2 | 0 | iqn.a.com:str2 | 2 | 2004/06/21 00:05 |
| iqn.a.com:str2 | 0 | iqn.a.com:str2 | 3 | 2004/06/21 00:10 |

3317

STORAGE SYSTEM AND METHOD FOR COPYING VOLUMES BY INSPECTION OF DATA SECURITY

CROSS-REFERENCE TO RELATED APPLICATIONS

The present application claims priority from Japanese application JP2004-255143 filed on Sep. 2, 2004, the content of which is hereby incorporated by reference into this application.

BACKGROUND

The present invention relates to a method for copying volume data in a storage device and particularly to a method for achieving safe copying of volume data without illegal data.

There has been recently spread SAN (Storage Area Network) in which a storage device is connected to a computer (hereinafter also referred to as host) by a network so that the host is allowed to read/write data from/into a volume in the storage device. There has been also spread serverless backup for achieving data copying by using the high speed of the SAN widely without interposition of LAN (Local Area Network). By serverless backup, data can be copied from one volume in a storage device to another volume in the storage device or a volume in another storage device through the SAN.

For backup/restoration based on volume copying of the storage device, it is essential that security inspection is performed to check backdoor data (hereinafter referred to as illegal data), such as infection of viruses or worms, falsification of data or illegal interpolation of data, in the file level. In the serverless backup, it is however difficult to perform security inspection in the file level because the serverless backup is carried out by block data based on SCSI (Small Computer System Interface) or the like. Therefore, in "Internet Security" (written by Othmar Kays, issued by International Thomson Publishing Japan), the inspection is carried out not on the storage device but on the host. The host inspects/monitors illegal data by a security inspection program such as an antivirus tool or an IDS (Intrusion Detection System) installed in the host per se. The host checks safety of data in a volume as a subject of inspection by inspection/monitoring based on the security inspection program.

In JP-A-2004-46435, a virus check function is provided to an exclusive controller so that virus check is performed on a replicated volume copied from a volume as a subject of inspection. If there is no virus detected by the virus check, the controller instructs the storage device to generate a new-level backup volume by copying the replicated volume. Incidentally, the term "new-level backup volume" means a volume in which a replica of data stored in a certain volume is stored (hereinafter referred to as replicated volume) and means each of volumes replicated when the replica of data is made at regular intervals.

SUMMARY

A problem concerning the "Internet Security" will be described below. As described above, the security inspection programs can be roughly classified into antivirus tools and IDSs. In the former, there is a possibility that illegal data inclusive of viruses will be written in the volume in accordance with the providing state of an antivirus program. In the latter, there is a possibility that illegal data will be written in the volume because only falsification or illegal interpolation of data is detected. That is, generally, the security inspection program cannot prevent illegal data perfectly from being written in the volume. On this occasion, the storage device copies the volume for replication at intervals of a predetermined period to generate a plurality of new-level backup volumes continuously regardless of the result of inspection based on the security inspection program. Accordingly, if illegal data is included in the volume for replication, the storage device generates new-level backup volumes including such illegal data continuously. In this case, the following problem occurs.

First, because the storage device generates unnecessary new-level backup volumes including illegal data continuously, wastefulness of resources occurs. According to occasion, a new-level backup volume may be overwritten because the new-level backup volume comes to where the new-level backup volume started. If overwriting occurs, it is difficult to restore data to a normal state because there is a possibility that illegal data will be included in all new-level backup volumes.

At the time of restoring data, an administrator has to carry out a complex operation of temporarily stopping the process of generating a new-level backup volume, retrieving and verifying safe data from a plurality of new-level backup volumes, restoring data actually, deleting unnecessary new-level backup volumes including illegal data, and restarting the process of generating a new-level backup volume. For this reason, both increase in man-hour and delay in work occur. As a result, there is a problem that reduction in service occurs for a long time.

A problem concerning JP-A-2004-46435 will be described below. The controller having a virus check function performs virus check on replicated volumes in which a replica of data stored in a volume for replication is stored. In this case, a long time is required for checking the replicated volumes individually because all data in each replicated volume need to be checked sequentially. For this reason, the check lacks real-time practicability. Moreover, because a long time is required for checking one replicated volume, there is a problem that a plurality of controllers need to be provided in a large-scale site which manages a large number of replicated volumes. In addition, if a virus is written in a volume for replication during checking, speedy data restoration cannot be performed because the virus cannot be detected until completion of next checking.

The controller can check viruses but cannot check falsification or illegal interpolation of data by using an IDS or the like. The IDS holds data in a normal state at a certain point of time and checks falsification, etc. of data by comparing the normal-state data with data at the present time. The controller, however, cannot check falsification, etc. of data because the normal-state data is generally managed on each host.

Moreover, as described above, the controller controls the storage device to generate a replicated volume copied from a volume for replication. On this occasion, the storage device generates the replicated volume without awareness of data matching with an upper application such as a database. In online backup with the warrant of data matching, a replicated volume needs to be generated after all data concerning one transaction such as a transaction in a database are stored in a volume for replication. For achievement of this, it is necessary to generate a replicated volume based on an instruction of an application program installed on the host and accommodated to online backup. It is however impossible. to perform backup with the warrant of data matching because the controller has no online backup function. There is therefore a problem that the man-hour required for restoring data increases.

In a system comprising a host, a storage device, and a management server connected to the host and the storage device through a network, the management server, the host or the storage device includes: means of acquiring a result of inspection by a security inspection program on the host whenever occasion arises; means of instructing the storage device to copy data from a volume for replication to which the host is connected to another volume when the present time is a backup time and no illegal data is detected in the content of the acquired result of inspection up to the present time; and means of instructing the storage device to copy data from the other volume to the volume for replication regardless of backup time if illegal data is detected in the content of the acquired result of inspection.

According to another embodiment of the invention, in a storage network system comprising: a storage device including volumes for storing data, and network communication means; and a host including means of reading/writing data from/into the volumes through a network, the host further includes: a security inspection program for generating an inspection log inclusive of a result of security inspection by performing security inspection of data communicated through the network; inspection log acquisition means for acquiring the inspection log generated by the security inspection program whenever occasion arises; and copy command issue means for issuing a copy command when there is no illegal data detected in the inspection log concerning the volume for replication at the time of copying data from the volume to another volume. Other embodiments of the invention will become clear from the following description in this specification.

BRIEF DESCRIPTION OF THE DRAWINGS

FIG. 6 is a view showing an example of a volume list for replication;

FIG. 7 is a view showing an example of control data;

FIG. 8 is a view showing an example of a multi-level backup volume list;

FIG. 9 is a view showing an example of an inspection log;

FIG. 10 is a view showing an example of control data;

FIG. 11 is a diagram showing an example of configuration of a system;

FIG. 22 is a view showing an example of a multi-level backup volume list.

DESCRIPTION OF THE EMBODIMENTS

A storage network system and a configuration for embodying a management server, a host and a storage device will be described with reference to the drawings.

Figure 1:
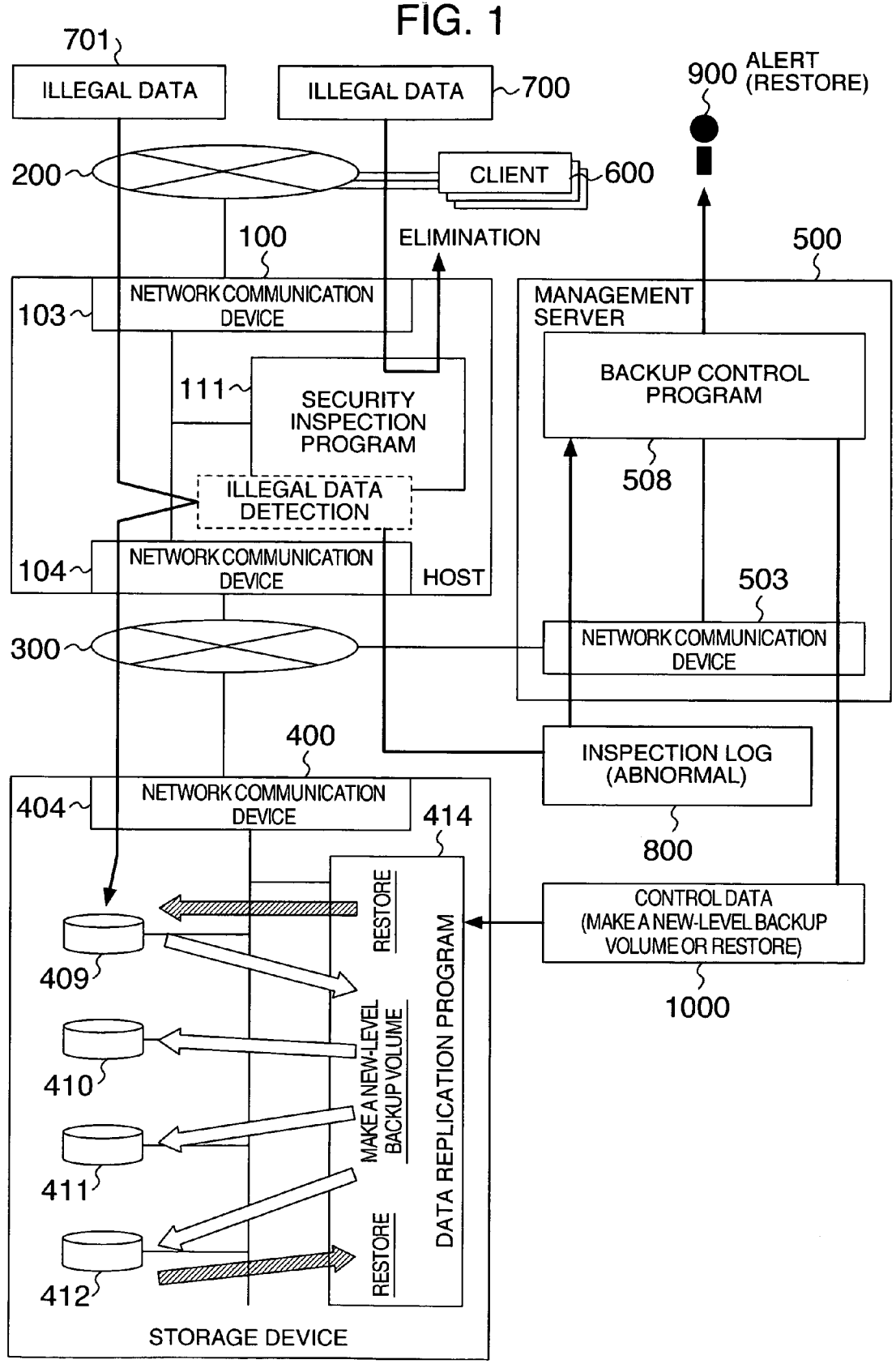
FIG. 1 is a diagram showing an example of configuration of a system.

Embodiment 1 will be described. FIG. 1 shows an example of system configuration of a storage network system according to this embodiment. This system comprises a host 100, a storage device 400, and a management server 500. The host 100, the storage device 400 and the management server 500 are connected to one another through a network 300. The host 100 can be connected to a group of clients 600 through a network 200. The management server 500 can be connected to an administrator device 900. The management server 500 performs management of copy time in the storage device 400, acquisition of information of a volume to be copied, acquisition of a result of virus check by the host 100, and transmission of a copy command (inclusive of a backup command and a restore command) to the storage device 400.

Figure 2:
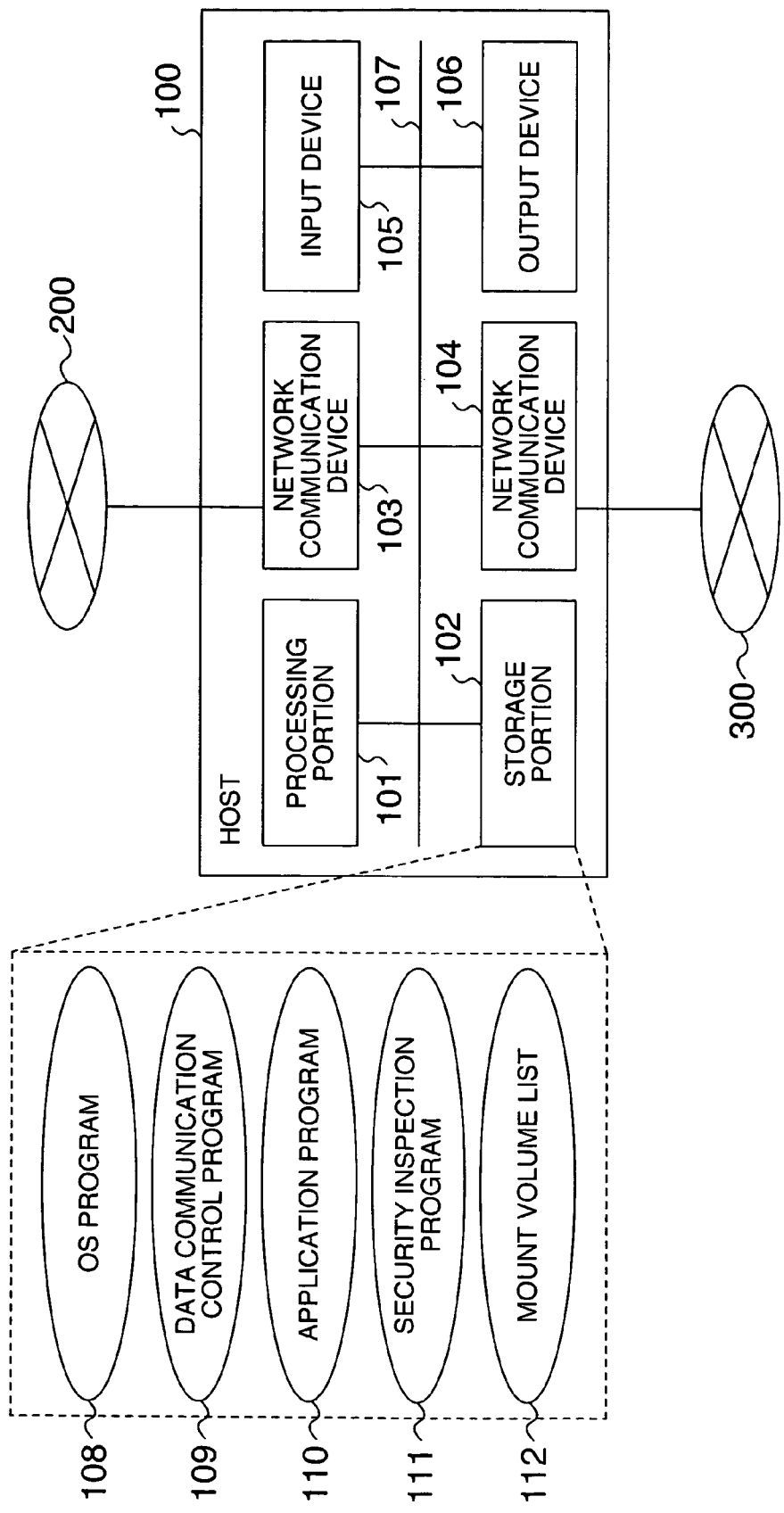
FIG. 2 is a diagram showing an example of configuration of a host.

The host in Embodiment 1 will be described. FIG. 2 shows details of the host 100. The host 100 includes: a processing portion 101 having a CPU, etc.; a storage portion 102 having a storage device such as an RAM; network communication devices 103 and 104; an input device 105 for inputting data from an input device such as a keyboard; an output device 106 for outputting data to an output device such as a display; and a bus 107 by which the respective portions and devices 101 to 106 are connected to one another. The storage portion 102 has: an OS program 108 for memory management, task management, etc. executed by the processing portion 101; a data communication control program 109 for communication with the storage device 400; an application program 110 for Web, mail, etc. operated on the OS program 108; and a security inspection program 111 which will be described later. The storage portion 102 further has a mount volume list 112 inclusive of a volume list for replication to make a new-level backup volume list, which will be described later. The host 100 is physically connected to the network 200 by the network communication device 103 so that a network communication process concerning the host 100 is carried out in a communication protocol of the network 200. For example, the communication protocol is IP (Internet Protocol). The host 100 is also physically connected to the network 300 by the network communication device 104 so that a network communication process concerning the host 100 is carried out in a communication protocol of the network 300. For example, the communication protocol is IP. The host 100 communicates with the storage device 400 (which will be described later) by iSCSI (Internet Small Computer Interface) through the network 300. The data communication control program 109 carries out a process concerning the iSCSI communication. Here, the host 100 executing the data communication control program 109 logically corresponds to an iSCSI initiator (the name of which will be hereinafter referred to as iqn.a.com:hst1). That is, the host 100 executes the data communication control program 109 (by the processing portion 101), so that the data communication control program 109 operates as an iSCSI initiator.

Figure 3:
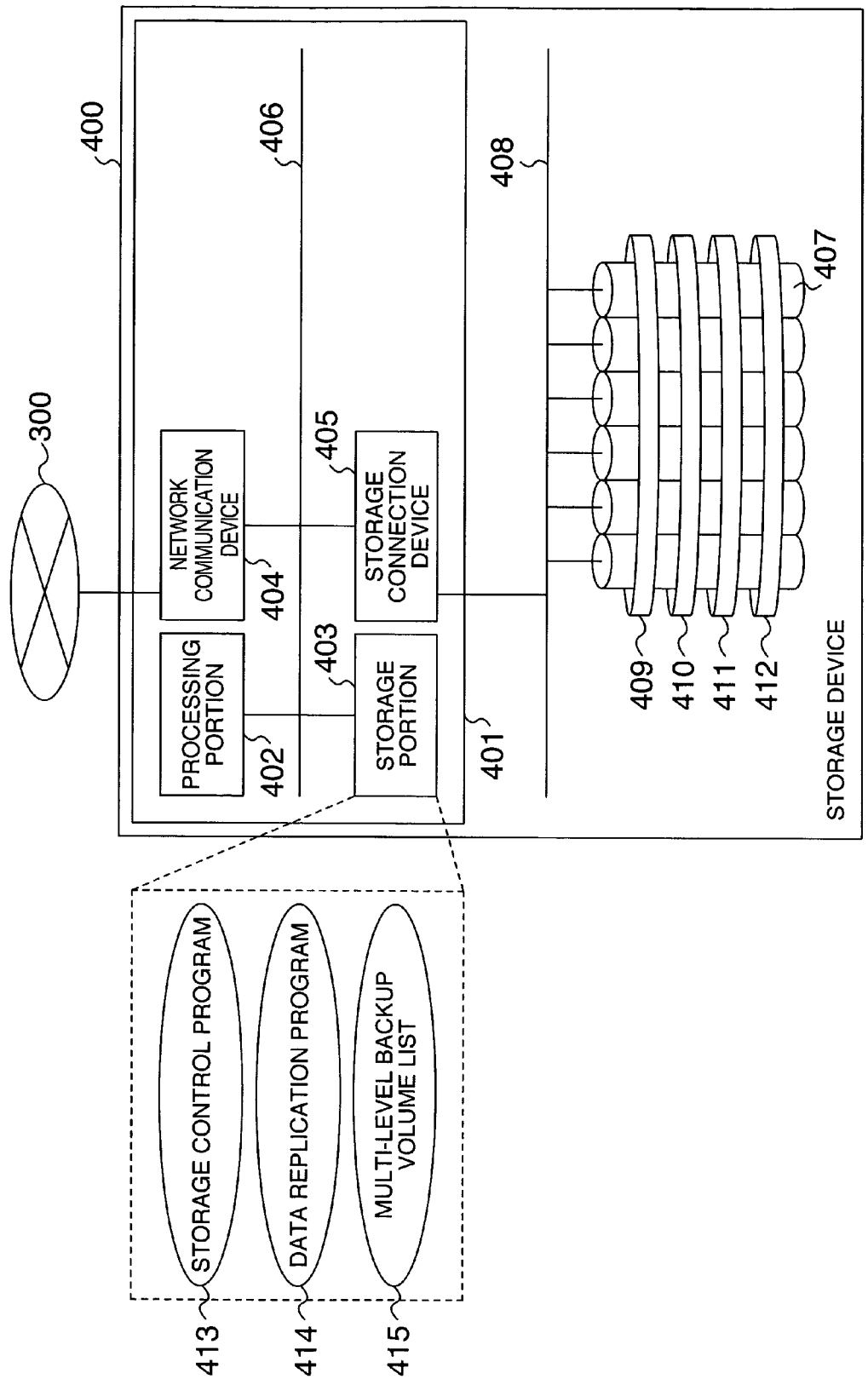
FIG. 3 is a diagram showing an example of configuration of a storage device.

The storage device in Embodiment 1 will be described. FIG. 3 shows details of the storage device 400. The storage device 400 includes a storage controller 401 for controlling the storage device 400 as a whole. The storage controller 401 has: a processing portion 402 having a CPU, etc.; a storage portion 403 having a storage device such as an RAM; a network communication device 404; a storage connection device 405; and a bus 406 by which the respective portions and devices 402 to 405 are connected to one another. The storage device 400 further includes a physical disk group 407, and a bus 408 by which the storage controller 401 and the physical disk group 407 are connected to each other. The physical disk group 407 forms logical units (hereinafter referred to as volumes) as logical storages for storing data actually by partially combining data storage regions of physical disks. The logical units are represented by volumes 409 to 412 in FIG. 3. The storage portion 403 has: a storage control program 413 for managing access to the volumes 409 to 412; a data replication program 414 for a data copying process from one volume to another volume; and a multi-level backup volume list 415 indicating log information concerning processing by the data replication program 414. The storage control program 413 and the data replication program 414 are carried out by the processing portion 402. The storage device 400 is physically connected to the network 300 by the network communication device 404, so that a network communication process concerning the storage device 400 is carried out in a communication protocol of the network 300. For example, the communication protocol is IP. As described above, the storage device 400 communicates with the host 100 by iSCSI. The storage device 400 executing the storage control program 413 logically corresponds to an iSCSI target (the name of which will be hereinafter referred to as iqn.a-.com:str1) for carrying out a process concerning the iSCSI communication. The storage device 400 communicates with the host 100 through the network communication device 404.

The storage control program 413 equivalent to an iSCSI target is executed by the processing portion 402 of the storage controller 401 so that the storage device 400 can communicate with the host 100 by iSCSI. The data communication control program 109 (iSCSI initiator) of the host 100 starts communication with the storage control program 413 through the network 300. For example, the storage control program 413 limits communication of the data communication control program 109 through itself to the volumes 409 to 412. Specifically, the iSCSI initiator iqn.a.com:hst1 of the host 100 can carry out iSCSI communication with the iSCSI target iqn.a.com:str1 of the storage device 400 and can be connected to the volumes 409 to 412 through the iSCSI target. The respective volumes can be identified on the basis of LUN (Logical Unit Number). For example, LUN=0 is allocated to the volume 409, LUN=1 is allocated to the volume 410, LUN=2 is allocated to the volume 411, and LUN=3 is allocated to the volume 412. Incidentally, the aforementioned processing can be achieved by an existing technique.

For the sake of convenience of description, it is assumed that the host 100 is iSCSI-connected to the volume 409 (LUN=0) by the aforementioned processing, and that the OS program 108 and the application program 110 on the host 100 carry out reading/writing of data from/into the volume 409. A method used in the host 100 for reading/writing data will be described later specifically.

In the host 100, the OS program 108, the application program 110 and the security inspection program 111 are always executed by the processing portion 101. Although description will be made while each program is regarded as a subject executing a process, the processing portion executing the program executes the process actually. As shown in FIG. 1, the application program 110 exchanges data with a client group 600 connected to the network 200. The data exchange is exchange of data concerning a service provided to the client group 600 by the application program 110 shown in FIG. 2. Description will be made on the assumption that the service provided by the application program 110 is HTTP (Hyper Text Transfer Protocol). The client group 600 sends request data (such as an HTTP GET method, etc.) to the application program 110 through the network 200, for example, to acquire a certain Web content. Upon reception of the request data through the network communication device 103 and the OS program 108, the application program 110 reads data concerning the designated Web content through the OS program 108 and transfers the data to the client group 600 through the network 200. On this occasion, the OS program 108 performs a process of reading necessary data from the volume 409 having the Web content stored therein by using the data communication control program 109 for achieving iSCSI communication. The OS program 108 identifies the Web content by a file name (e.g. /data/html/index.html) so that a device name (e.g. /dev/sdh, corresponding to an LU) in which a storage destination partition (/data) of the file is allocated and which is identified on the OS program 108 can be deduced from the file name. The OS program 108 can further deduce the iSCSI initiator name (iqn.a.com:hst1) held by the data communication control program 109, the iSCSI target name (iqn.a.com:str1) as the destination of connection and the LUN (in this example, LUN=0 indicating the volume 409), concerning iSCSI communication using the device name. When iSCSI communication is carried out on the basis of the aforementioned information, reading/writing of necessary data can be achieved. The aforementioned processing can be achieved by an existing technique. As a result, the application program 110 carries out reading/writing of data stored in the volume 409 through the OS program 108 and the data communication control program 109.

Incidentally, iSCSI communication operates on the IP network. In this case, it is necessary to acquire an IP address as information communicatable on the IP network from the iSCSI initiator name and the iSCSI target name. An iSNS (Internet Storage Name Service) server is an existing technique for achieving the aforementioned processing. The host 100, the storage device 400 and the management server 500 which will be described later can retrieve an IP address from the iSCSI initiator name and the iSCSI target name (called iSCSI name) by inquiring of the ISNS server (the iSCSI target has a TCP port number waiting for iSCSI communication). As a result, iSCSI communication can be achieved on the IP network.

On this occasion, the security inspection program 111 always inspects communication data which the OS program 108 and the application program 110 exchange with the client group 600 and the storage device 400 (volume 409). The security inspection program 111 for carrying out the inspection shows a program such as an antivirus tool for detecting and eliminating viruses, worms, etc. or IDS for detecting illegal falsification of data such as Web contents and illegal access to the host 100. The security inspection program 111 can be achieved by an existing technique. The illegal data 700 and 701 in FIG. 1 show communication data concerning the viruses and worms, illegal falsification and illegal access. The client group 600 sends the illegal data 700 and 701. When the security inspection program 111 includes an antivirus program for eliminating viruses and worms as represented by the illegal data 700 in FIG. 1, data can be eliminated without writing of the illegal data 700 into the volume 409. The illegal data 701 is however written into the volume 409 because the security inspection program 111 cannot cope with the illegal data 701 indicating other viruses and worms, illegal falsification and illegal access. On this occasion, the security inspection program 111 detects writing of the illegal data 701 into the volume 409 as shown in FIG. 1, generates an inspection log 800 for indicating the writing of the illegal data 701 and sends the inspection log 800 to the management server 500 (which will be described later) whenever the writing of the illegal data 701 is detected.

Figure 4:
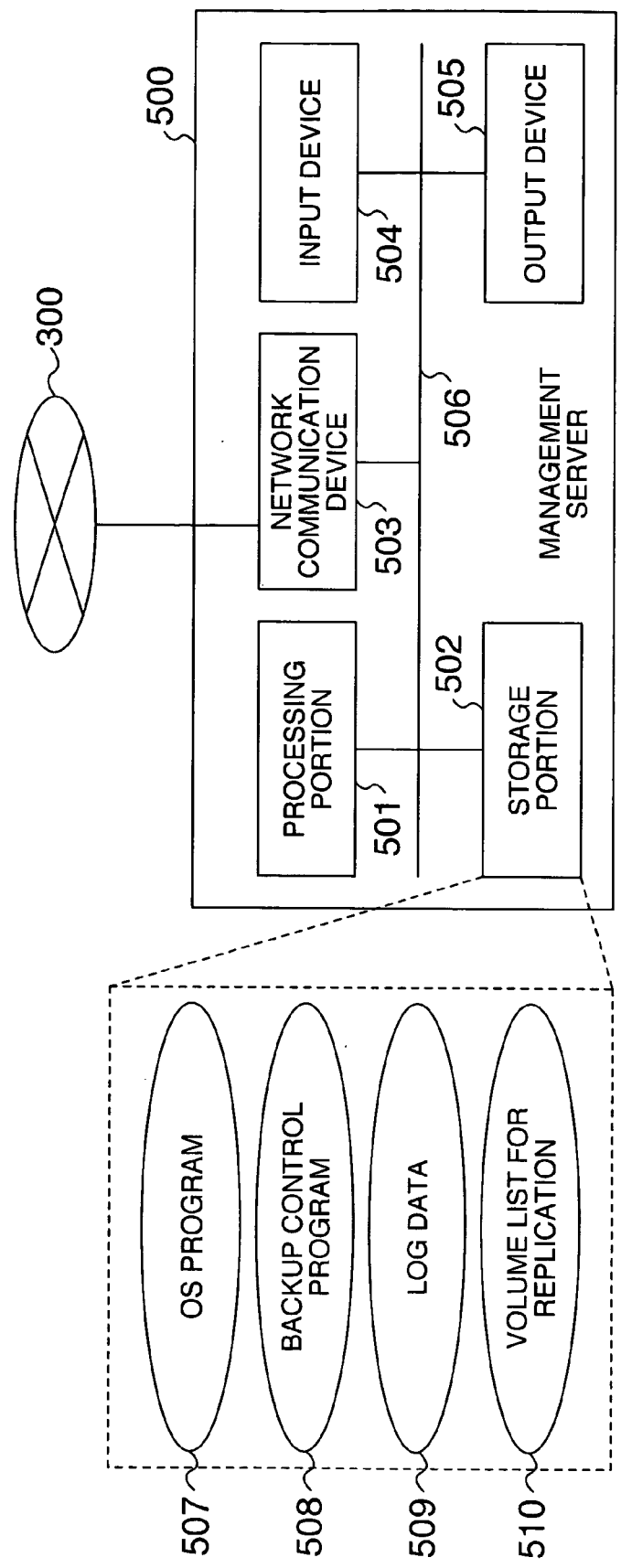
FIG. 4 is a diagram showing an example of configuration of a management server.

The management server in Embodiment 1 will be described below. FIG. 4 shows details of the management server 500. The management server 500 includes: a processing portion 501 having a CPU, etc. and, for example, serving a backup controller; a storage portion 502 having a storage device such as an RAM; a network communication device 503; an input device 504 for inputting data from an input device such as a keyboard; an output device 505 for outputting data to an output device such as a display; and a bus 506 by which the respective portions and devices 501 to 505 are connected to one another. The storage portion 502 has: an OS program 507 for memory management, task management, etc. executed by the processing portion 501; a backup control program 508 operated on the OS program 507; and log data 509 for temporarily storing the inspection log 800 shown in FIG. 1. The management server 500 is physically connected to the network 300 by the network communication device 503, so that the management server 500 performs a process for communication with the host 100 and the storage device 400 (e.g. in the IP protocol).

The management server 500 performs acquisition of a safe new-level backup volume list based on a result of the virus check by the security inspection program 111 and transmission of a copy command (inclusive of a restore command) based on the safe new-level backup volume list for the volume in the storage device 400 from/into which the host 100 is reading/writing data. To achieve the aforementioned process, the management server 500 executes the backup control program 508 to collect the mount volume list 112 from the host 100. In addition, the management server executes the backup control program 508 to acquire the inspection log 800 as a result of the inspection by the security inspection program 111 and issues a necessary command such as a command to make a new-level backup volume or a restore command to the storage device 400. The backup control program 508 will be described below in detail.

Figure 5:
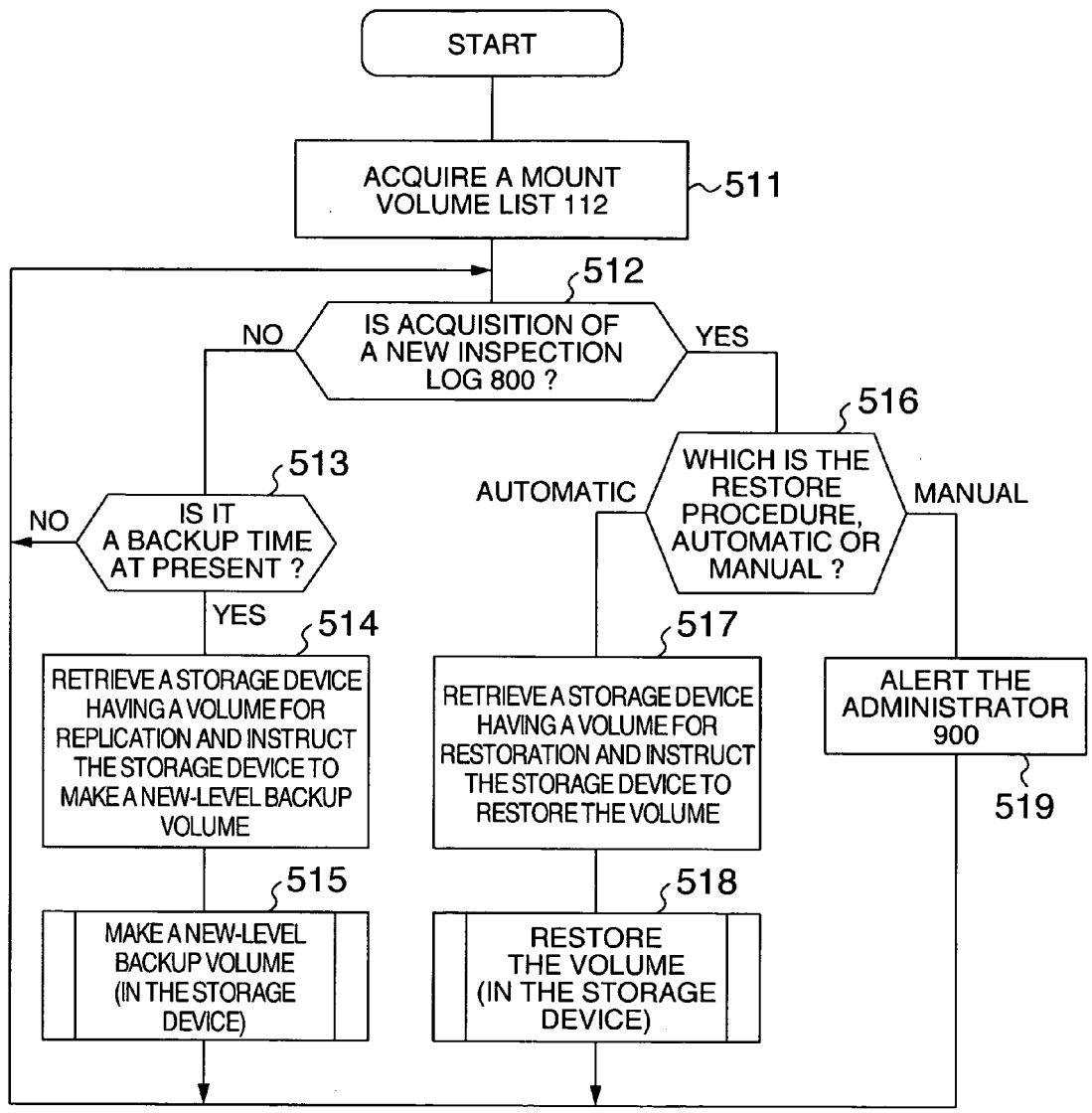
FIG. 5 is a flow chart showing an example of processing flow of a backup control program.

FIG. 5 is a flow chart showing an example of the processing procedure of the backup control program. In step 511 shown in FIG. 5, the backup control program 508 acquires a mount volume list 112 from the host 100. The mount volume list 112 is managed by the host 100 and includes information concerning which volume is used as a subject of acquisition of a new-level backup volume. The mount volume list 112 includes iSCSI initiator names, iSCSI target names and LUNs, concerning the volumes to which the host 100 is connected. An existing technique can be used so that the mount volume list 112 can be acquired by the OS program 108. It is assumed now that the host 100 is connected to the volume 409 and is reading/writing data from/into the volume 409. The host 100 sends the mount volume list 112 to the backup control program 508 of the management server 500 by using an existing technique such as Syslog. The backup control program 508 collects the mount volume list 112 received from respective hosts including the host 100 to thereby generate a volume list 510 for replication. FIG. 6 shows an example of the format of the volume list 510 for replication. The volume list 510 for replication includes information concerning the iSCSI initiator name in the volume of the storage device from/into which the host is reading/writing data by iSCSI communication, the iSCSI target name on the storage device side, and LUN. For example, information concerning the volume 409 to which the host 100 is connected is shown in the first line in FIG. 6 and corresponds to the mount volume list 112 managed by the host 100. Information concerning another volume to which the host 100 is connected (e.g. LUN=7 in the storage device 400) as shown in the second line in FIG. 6 and information concerning another volume to which another host (iSCSI initiator name: iqn.a-.com:hst2) is connected as shown in the third line in FIG. 6 can be also managed. By the aforementioned process, the backup control program 508 can recognize that the volume 409 to which the host 100 is connected (and the volume shown in the second line in FIG. 6) is a volume for replication to make a new-level backup volume.

In step 512 shown in FIG. 5, the backup control program 508 waits for reception of the inspection log 800 generated by the security inspection program 111. The security inspection program 111 sends the inspection log 800 to the backup control program 508 through the network 300 by using an existing technique such as Syslog. The backup control program 508 stores the inspection log 800 received via Syslog as log data 509 suitably. If there is no new inspection log 800 received at the present time, the backup control program 508 goes to step 513. If there is a new inspection log 800 received, the backup control program 508 goes to step 516.

As described above, the inspection log 800 is sent to the backup control program 508 whenever the security inspection program 111 detects illegal data. Accordingly, if there is no new inspection log 800 received in this step, the backup control program 508 goes to step 513 because the result of security inspection concerning the host 100 is normal. If there is a new inspection log 800 received, the backup control program 508 goes to step 516 because the inspection log 800 indicates that the result of security inspection concerning the host 100 is abnormal. By the aforementioned procedure, the backup control program 508 can recognize the result of security inspection concerning the host 100 in real time.

In step 513 shown in FIG. 5, the backup control program 508 checks whether the present time is a backup time based on a predetermined backup period or not. The backup control program 508 manages information corresponding to a backup period, for example, of 5 minutes. The backup period can be set by the administrator device 900 or administrator through the input device 504 in advance. The backup control program 508 judges from the present time and the backup period information whether the present time is a backup time or not. If the present time is a backup time, the backup control program 508 goes to step 514. Otherwise, the backup control program 508 goes back to step 512.

In step 514 shown in FIG. 5, the backup control program 508 generates control data 1000 in which a necessary processing command to be issued to the storage device having the volume for replication to make a new-level backup volume is written. When there is no inspection log 800 received and the present time is a backup time at the point of time that processing in this step is completed, control data 1000 in which a command to copy data from the volume for replication to another volume is written is issued to the storage device by the backup control program 508.

The backup control program 508 uses the volume list 510 for replication to specify the storage device having the volume for replication. As described above, copying of the volume for replication is executed when there is no inspection log 800 received for the volume. As will be described later in detail, the inspection log 800 includes information such as iSCSI initiator names, iSCSI target names and LUNs, concerning the volume in which illegal data is detected, as shown in FIG. 9. Accordingly, the backup control program 508 can specify volumes having no illegal data detected from the three pieces of information in the inspection log 800 received up to the present time and the volume list 510 for replication. Because there is no inspection log 800 received for the volume 409 in this example, the backup control program 508 can issue the control data 1000 to the storage device 400 having the volume 409 and identified by the iSCSI target name of iqn.a.com:str1 (at the same time, this rule applies to the second and third lines shown in FIG. 6 but the detailed description of the second and third lines will be omitted).

FIG. 7 shows an example of the format of the control data. The control data 1000 shown in FIG. 7 includes information such as the iSCSI initiator name concerning the volume 409, the iSCSI target name as a destination of connection and the LUN, specified by the aforementioned process. The control data 1000 further includes the content of actual processing (e.g. to make a new-level backup volume) concerning each volume for replication. Accordingly, as shown in FIG. 7, the control data 1000 includes information such as the iSCSI target name "iqn.a.com:str1" and LUN=0 in the storage device 400, which indicates the volume 409. The backup control program 508 sends the control data 1000 to the storage device 400 through the network 300, for example, by SNMP Trap.

In step 515 shown in FIG. 5, when the control data 1000 is received by the storage controller 401 provided in the storage device 400, the received control data 1000 is sent to the data replication program 414 to perform the following volume copying process.

The data replication program 414 copies data from one volume on the storage device 400 to another volume on the storage device 400. This process can be achieved by an existing technique. In the storage controller 401, the data replication program 414 is executed by the processing portion 402 to carry out a process of copying data from one volume on the storage device 400 to another volume on the storage device 400 through the storage connection device 405. The data replication program 414 copies data from the volume 409 allowed to be specified on the basis of the control data 1000 to a volume (LUN=1) 410 which is not used at the present time. Then, the data replication program 414 writes log information indicating completion of copying of data from the volume 409 to the volume 410, into the multi-level backup volume list 415. FIG. 8 shows an example of the format of the multi-level backup volume list. As shown in FIG. 8, the multi-level backup volume list 415 includes information such as iSCSI target names and LUNs of copy source volumes, iSCSI target names and LUNs of copy destination volumes and backup-making time. In this example, the log information corresponds to information on the first line. After completion of the copying, the storage controller 401 sends a message indicating the completion of processing to the backup control program 508 through the network 300, for example, by using SNMP Trap or the like.

After the completion of the aforementioned processing, the backup control program 508 goes back to step 512 to repeat the aforementioned procedure. When the processing goes from step 512 to step 515 again, the backup control program 508 acquires a copy of the volume 409 again. As described above, the data replication program 414 copied data from the volume 409 to the volume 410. In this processing, the data replication program 414 copies data from the volume 409 to another volume (LUN=2) 411. In the next processing, the data replication program 414 copies data from the volume 409 to another volume (LUN=3) 412. In each processing, the data replication program 414 writes log information in the multi-level backup volume list 415 (log information corresponds to the second or third line in FIG. 8). By repeating the aforementioned process, the volumes 410 to 412 are used as new-level backup volumes for the volume 409 in accordance with the backup period managed by the backup control program 508 described above.

By the aforementioned process, the storage device 400 can generate new-level backup volumes for the volume 409 easily and in real time while safety can be warranted on the basis of the result of inspection by the security inspection program 111 as described above. Incidentally, as described above, the backup control program 508 manages the volume list 510 for replication shown in FIG. 6. A plurality of volumes connected to one host and information concerning a plurality of hosts can be managed in the volume list 510 for replication. Accordingly, generation of the new-level backup volumes under the aforementioned condition by the backup control program 508 can be achieved by the same process as described above. Although description has been made on the case where there is no new inspection log acquired in step 512, this case may be replaced by the case where the result of inspection by the security inspection program 111 is not abnormal.

An example of the processing procedure concerning the backup control program will be described below in the case where the result of inspection by the security inspection program is abnormal. In step 516 shown in FIG. 5, the backup control program 508 judges whether a necessary command is to be sent to the storage device or to the administrator device 900 shown in FIG. 1. At the point of time that processing in this step is completed, the backup control program 508 recognizes the fact that the result of security inspection concerning the host 100 is abnormal because of reception of the inspection log 800. It is therefore necessary to restore data by copying data from a safe new-level backup volume to the volume for replication because the volume for replication includes illegal data such as viruses/worms or falsified data. The system according to this embodiment is configured so that either a process for instructing the storage device 400 to copy the volume automatically or a process for alerting the administrator device 900 to restore data can be selected in order to satisfy various requirements of users. Therefore, the backup control program 508 goes to step 517 to perform the former process when the value of a restoration judgment file, for example, set by the administrator device 900 through the input device 504 in advance is "0" whereas the backup control program 508 goes to step 519 to perform the latter process when the value is "1".

In step 517 shown in FIG. 5, the backup control program 508 generates control data 1000 which is to be issued to a storage device having a volume to be restored and in which a necessary processing command is written. The backup control program 508 restores the volume for replication to a safe state by issuing a command to the storage device to copy data from the new-level backup volume acquired in the step 515 to the volume for replication in which illegal data shown by the inspection log 800 is found. FIG. 9 shows an example of the format of the inspection log. As shown in FIG. 9, the inspection log 800 includes information such as the name of a file in which illegal data is detected by inspection, the result of inspection, the iSCSI initiator name in iSCSI communication concerning the volume in which data of the file name is stored, the iSCSI target name, and the LUN. For example, let the file name be/data/html/index.html. Let the result of inspection be abnormal. Let the iSCSI initiator name be ign.a-.com:hst1. Let the iSCSI target name be ign.a.com.str1. Let the LUN be 0. The backup control program 508 can specify the volume for replication and the storage device as a destination of the control data 1000 on the basis of the aforementioned information so that the volume for replication is the volume 409, and that the storage device to which the control data 1000 is to be issued is the storage device 400.

FIG. 10 shows an example of the format of the control data. The control data 1000 shown in FIG. 10 includes information such as the iSCSI target name and the LUN specified by the aforementioned process and concerning the volume 409, and the content of actual processing for the volume (e.g. restore). Accordingly, as shown in FIG. 10, the control data 1000 includes information such as the iSCSI target name "iqn.a-.com:str1" of the storage device 400 and LUN=0 concerning the volume 409 in this example, and the content "restore" of processing. The backup control program 508 sends the control data 1000 to the storage device 400 through the network 300, for example, by SNMP Tap or the like.

In step 518 shown in FIG. 5, the control data 1000 is received by the storage controller 401 of the storage device 400. The received control data 1000 is sent to the data replication program 414 to carry out the following volume copying process.

The data replication program 414 restores (copies) data from the new-level backup volume acquired in the step 515 to the volume 409 which can be specified on the basis of the control data 1000. The data replication program 414 refers to the multi-level backup volume list 415 generated in the step 515 in order to retrieve the new-level backup volume as a copy source. As shown in FIG. 8, the data replication program 414 can specify new-level backup volumes for the volume 409 on the basis of the iSCSI target name and LUN of the volume 409 so that the new-level backup volumes are volumes 410 to 412. Then, the data replication program 414 copies data from the volume 412 latest in backup-making time and allowed to be retrieved by referring to the multi-level backup volume list 415 to the volume 409. (If the volumes 410 to 412 are provided as differential copies of the volume 409, the restoring process in the step 515 may be performed in order of the newest volume 412, the volume 411 and the volume 410). Incidentally, on this occasion, the storage control program 413 may temporarily stop writing of data from the host 100 into the volume 409 in accordance with necessity. After completion of the copying, the storage controller 401 sends a message indicating the completion of processing to the backup control program 508 through the network 300, for example, by using SNMP Trap or the like.

After completion of the aforementioned processing, the backup control program 508 goes back to the step 512 to repeat the aforementioned procedure.

In step 519 shown in FIG. 5, the backup control program 508 alerts the administrator device 900 to the restore command in place of the step 517. The alert to the restore command can be achieved by an existing technique such as SNMP Trap or mail. The alert includes information such as the iSCSI target name and LUN of the volume to be restored. After completion of the aforementioned processing, the backup control program 508 goes back to the step 512 to repeat the aforementioned procedure.

By repeating the aforementioned process, the storage device 400 can achieve data restoration of the volume 409 as a subject of restoration easily and in real time on the basis of data with safety warranted.

Embodiment 2 will be described. In this embodiment, the backup control program 508 is disposed in the storage portion 102 of the host 100. The same effect as in Embodiment 1 can be obtained. FIG. 11 is a diagram showing the configuration of a system according to this embodiment. The system according to this embodiment comprises: a host 1100 having the backup control program 508; and a storage device 400 connected to the host 1100 through a network 300. The host 1100 performs execution of the security inspection program, management of copy time in the storage device 400, acquisition of volume information as a subject of copying, acquisition of a result of virus check in the host 1100, and transmission of a copy command (inclusive of a backup command and a restore command) to the storage device 400.

Figure 12:
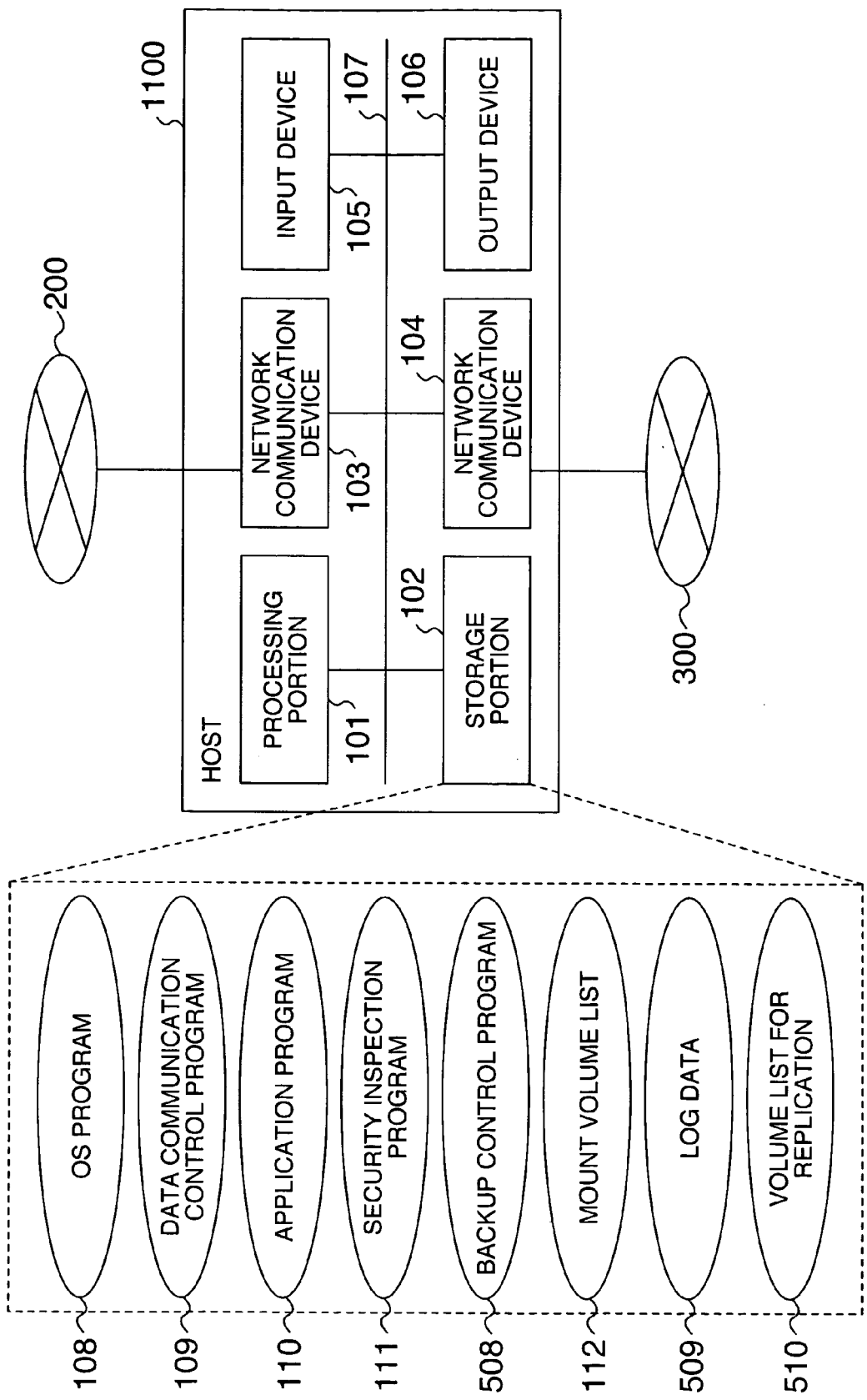
FIG. 12 is a diagram showing an example of configuration of a host.

The host in Embodiment 2 will be described. FIG. 12 shows details of the host. As described above in Embodiment 1, the host 1100 includes a processing portion 101, a storage portion 102, network communication device 103 and 104, an input device 105, an output device 106, and a bus 107 by which the respective portions and devices 101 to 106 are connected to one another. As described above in Embodiment 1, the storage device 102 has an OS program 108, a data communication control program 109 equivalent to an iSCSI initiator, an application program 110, a security inspection program 111, and a backup control program 508. The respective programs are executed by the processing portion 101. The storage portion 102 further has a mount volume list 112, log data 509, and a volume list 510 for replication. Similarly to Embodiment 1 described above, the host 1100 communicates with the storage device 400 through the network 300 by iSCSI. The data communication control program 109 performs a process concerning the iSCSI communication. Let the iSCSI initiator name be "iqn.a.com:hst1". As described above, the OS program 108 and the application program 110 are reading/writing data from/into the volume 409 in the storage device by iSCSI communication. The security inspection program 111 always inspects data exchanged with the client group 600 and the storage device 400 by the OS program 108 and the application program 110. The security inspection program 111 detects writing of illegal data 701 into the volume 409, generates an inspection log 800 indicating the writing of illegal data 701 and outputs the inspection log 800 to log data 509.

An example of the procedure in the backup control program executed by the host 1100 will be described below. Incidentally, since the procedure which will be described here is almost the same as that shown in FIG. 5, the procedure will be described with the assistance of FIG. 5. The following description may be made with the assistance of FIG. 5. In step 511 shown in FIG. 5, the backup control program 508 acquires a mount volume list 112 from the storage portion 102 (the OS program 108) and generates a volume list 510 for replication as shown in FIG. 6, in the same manner as in the step 511 in Embodiment 1. On this occasion, the backup control program 508 can recognize that the volume 409 connected to the host 1100 is a volume for replication to make a new-level backup volume.

In step 512 shown in FIG. 5, the backup control program 508 waits for reception of an inspection log 800 generated by the security inspection program 111, in the same manner as in the step 512 in Embodiment 1. If there is no new inspection log 800 received at the present time, the backup control program 508 goes to step 513. If there is a new inspection log 800 received, the backup control program 508 goes to step 516.

In step 513 shown in FIG. 5, the backup control program 508 checks whether the present time is a backup time based on a predetermined backup period or not, in the same manner as in the step 513 in Embodiment 1. The administrator device 900 can set the backup period by using the input device 105.

The backup control program 508 judges from the present time and the backup period information whether the present time is a backup time or not. If the present time is a backup time, the backup control program 508 goes to step 514. Otherwise, the backup control program 508 goes back to step 512.

In step 514 shown in FIG. 5, the backup control program 508 generates control data 1000 in which a necessary processing command is written, on the basis of the information of the volume list 510 for replication and issues the control data 1000 to the storage device 400, in the same manner as in the step 514 in Embodiment 1.

In step 515 shown in FIG. 5, when the control data 1000 is received by the storage controller 401 of the storage device 400, the data replication program 414 of the storage device 400 copies data from the volume 409 to the volume 410 in the same manner as in the step 515 in Embodiment 1.

After the completion of the aforementioned processing, the backup control program 508 goes back to step 511 to repeat the aforementioned procedure.

By the aforementioned process, the storage device 400 can generate new-level backup volumes for the volume 409 easily and in real time while safety can be warranted on the basis of the result of inspection by the security inspection program 111 as described above.

An example of the processing procedure concerning the backup control program will be described below in the case where the result of inspection by the security inspection program is abnormal. In step 516 shown in FIG. 5, the backup control program 508 performs the same process as in the step 516 in Embodiment 1. For example, the backup control program 508 goes to step 517 to perform the former process when the value of a restoration judgment file set by the administrator device 900 through the input device 504 in advance is "0" whereas the backup control program 508 goes to step 519 to perform the latter process when the value is "1".

In step 517 shown in FIG. 5, the backup control program 508 generates control data 1000 in which a necessary processing command is written, on the basis of information of the inspection log 800 and issues the control data 1000 to the storage device 400, in the same manner as in the step 517 in Embodiment 1.

In step 518 shown in FIG. 5, when the control data 1000 is received by the storage controller 401 of the storage device 400, the data replication program 414 of the storage device 400 copies data from the volume 410 to the volume 409 in the same manner as in the step 518 in Embodiment 1.

After completion of the processing, the backup control program 508 goes back to the step 512 to repeat the aforementioned procedure.

In step .518 shown in FIG. 5, the backup control program 508 performs the same process as in the step 518 in Embodiment 1.

By repeating the aforementioned processing, the storage device 400 can achieve data restoration of the volume 409 as a subject of restoration easily and in real time on the basis of data with safety warranted.

Figure 13:
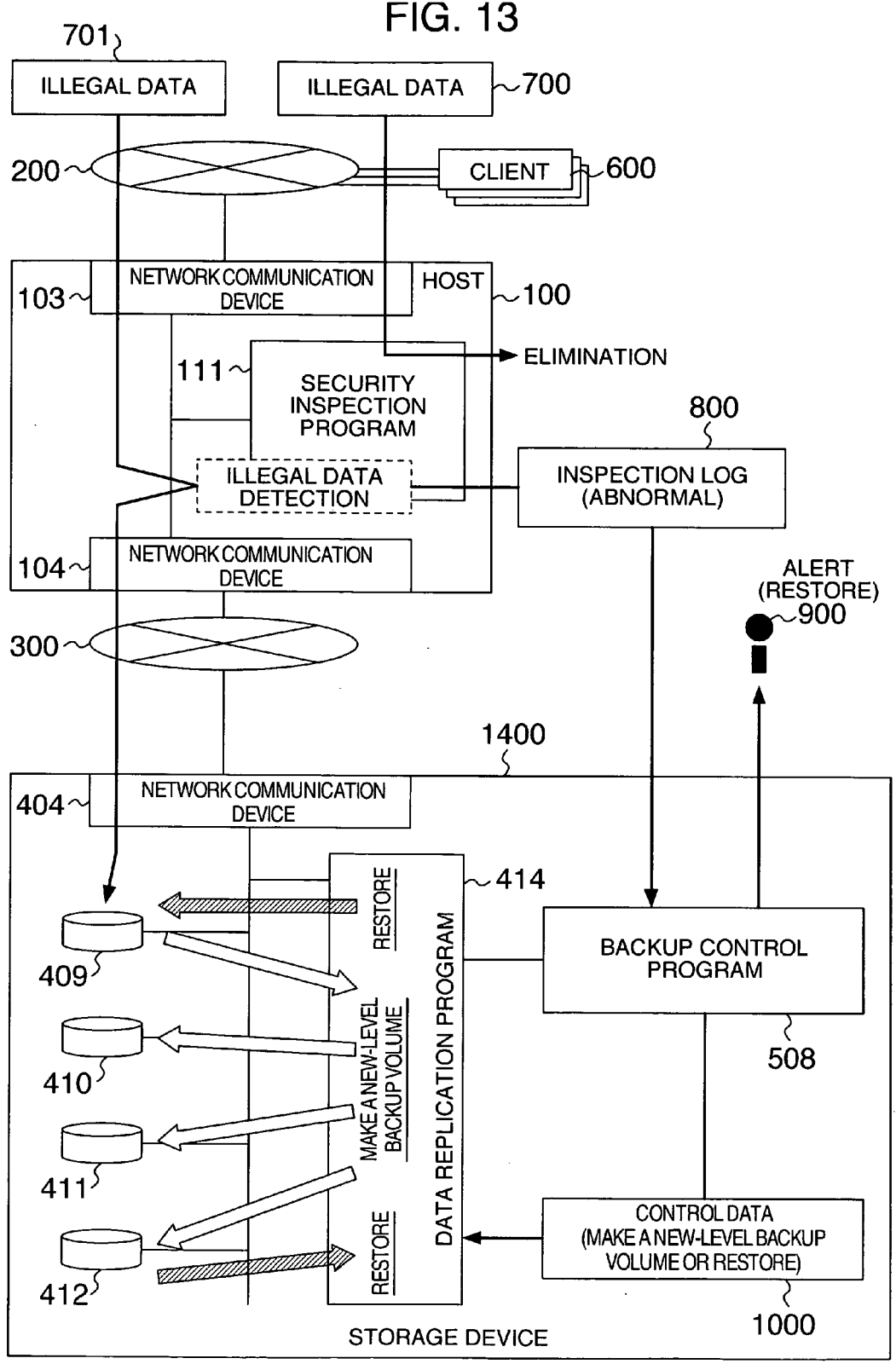
FIG. 13 is a diagram showing an example of configuration of a system.

Embodiment 3 will be described. In this embodiment, the backup control program 508 described in Embodiment 1 is disposed in the storage portion 403 of the storage device 400. The same effect as described in Embodiment 1 can be obtained. FIG. 13 is a diagram showing the configuration of a system according to this embodiment. The system according to this embodiment comprises a host 100, and a storage device 1400 connected to the host 100 through a network 300 and including the backup control program 508. The storage device 1400 performs management of copy time, acquisition of volume information as a subject of copying, acquisition of a result of virus check by the host 100, and execution of a copy command (inclusive of a backup command and a restore command).

Figure 14:
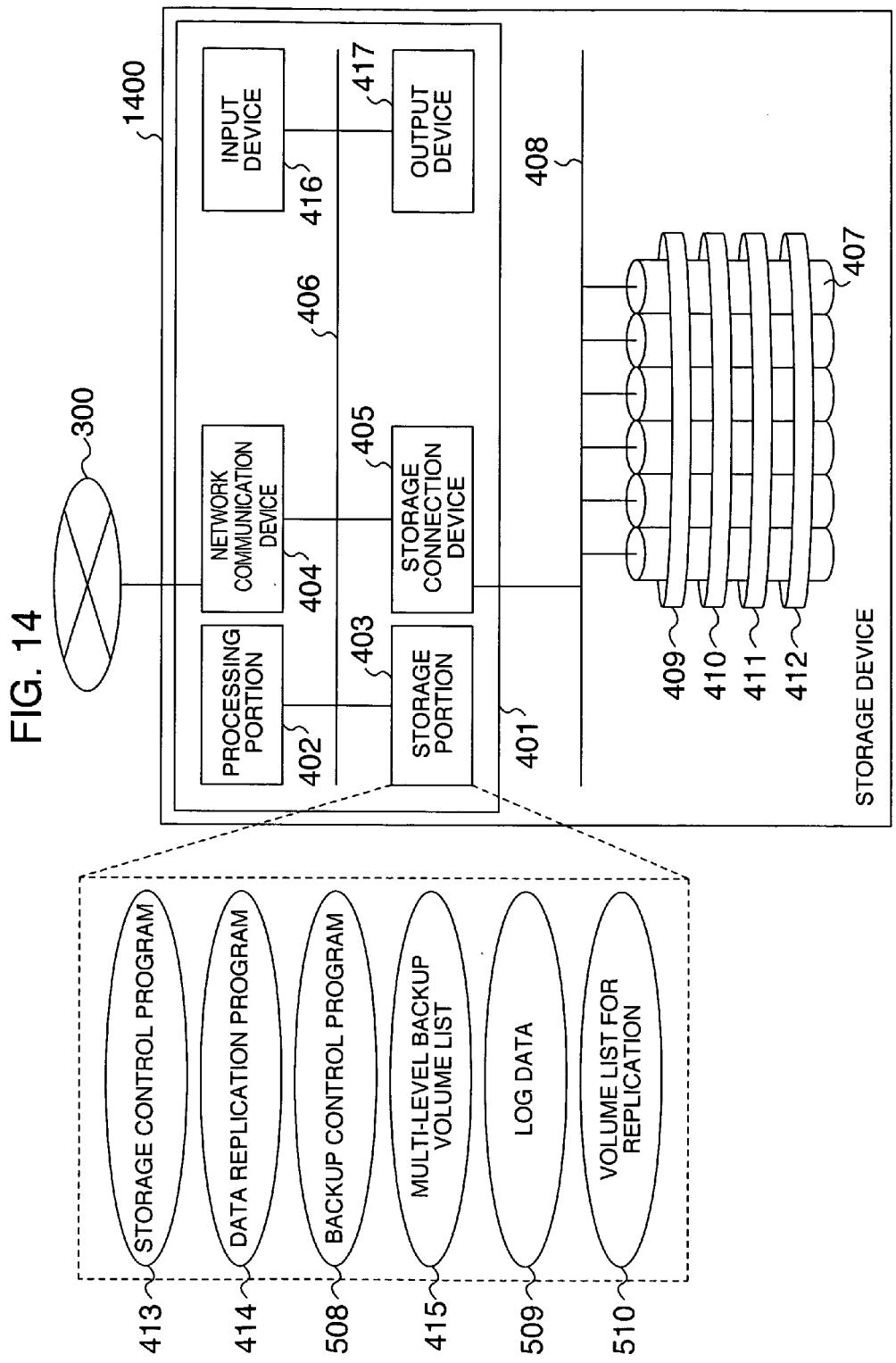
FIG. 14 is a diagram showing an example of configuration of a storage device.

The storage device in Embodiment 3 will be described. FIG. 14 shows details of the storage device. The storage device 1400 includes a storage controller 401 as described above in Embodiment 1. The storage controller 401 is configured to have a processing portion. 402, a storage portion 403, a network communication device 404, a storage connection device 405, an input device 416 for inputting data from an input device such as a keyboard, an output device 417 for outputting data to an output device such as a display, and a bus 406 by which the respective portions and devices 402 to 405, 416 and 417 are connected to one another. The storage device 1400 is configured to further include a physical disk group 407 connected to the storage controller 401 by a bus 408. The physical disk group 407 forms logical units (LUs) for storing data actually by partially combining data storage regions. The logical units (LUs) are represented by volumes 409 to 412. The storage portion 403 has a storage control program 413, a data replication program 414, and a backup control program 508. The programs are executed by the processing portion 402. The storage portion 403 further has a multi-level backup volume list 415, log data 509, and a volume list 510 for replication. The storage device 1400 communicates with the host 100 by iSCSI in the same manner as described above. The storage control program 413 is equivalent to an iSCSI target (named as "iqn.a.com:str1" in this embodiment) for performing a process concerning the iSCSI communication. The storage control program 413 communicates with the host 100 through the network communication device 404. Similarly, the data communication control program 109 of the host 100 performs a process concerning the iSCSI communication and an iSCSI initiator name is iqn.a.com:hst1. As described above, the OS program 108 and the application program 110 are reading/writing data from/into the volume 409 in the storage device by iSCSI communication. The security inspection program 111 always inspects data exchanged with the client group 600 and the storage device 1400 by the OS program 108 and the application program 110. The security inspection program 111 detects writing of illegal data 701 into the volume 409 and generates an inspection log 800 in which a massage of the writing of illegal data is written.

An example of the procedure in the backup control program executed by the storage device 1400 will be described below. Incidentally, since the procedure which will be described here is almost the same as that shown in FIG. 5, the procedure will be described with the assistance of FIG. 5. The following description may be made with the assistance of FIG. 5. In step 511 shown in FIG. 5, the backup control program 508 acquires a mount volume list 112 from the host 100, etc. and generates a volume list 510 for replication shown in FIG. 6, in the same manner as in the step 511 in Embodiment 1. On this occasion, the backup control program 508 can recognize that the volume 409 connected to the host 100 is a volume for replication to make a new-level backup volume.

In step 512 shown in FIG. 5, the backup control program 508 waits for reception of an inspection log 800 generated by the security inspection program 111 in the same manner as in the step 512 in Embodiment 1. If there is no new inspection log 800 received at the present time, the backup control program 508 goes to step 513. If there is a new inspection log 800 received, the backup control program 508 goes to step 516.

In step 513 shown in FIG. 5, the backup control program 508 checks whether the present time is a backup time based on a predetermined backup period or not, in the same manner as in the step 513 in Embodiment 1. The administrator 900 can set the backup period by using the input device 416. The backup control program 508 judges from the present time and the backup period information whether the present time is a backup time or not. If the present time is a backup time, the backup control program 508 goes to step 514. Otherwise, the backup control program 508 goes back to step 512.

In step 514 shown in FIG. 5, the backup control program 508 generates control data 1000 in which a necessary processing command to be executed by the storage device 1400 is written, on the basis of the information of the volume list 510 for replication and issues the control data 1000 to the storage device 1400, in the same manner as in the step 514 in Embodiment 1.

In step 515 shown in FIG. 5, when the control data 1000 is received by the storage controller 401 of the storage device 1400, the data replication program 414 of the storage device 1400 copies data from the volume 409 to the volume 410 in the same manner as in the step 515 in Embodiment 1.

After completion of the aforementioned processing, the backup control program 508 goes back to step 512 to repeat the aforementioned procedure.

By the aforementioned process, the storage device 1400 can generate new-level backup volumes for the volume 409 easily and in real time while safety is warranted by the result of inspection by the security inspection program 111.

An example of the procedure concerning the backup control program will be described below in the case where the result of inspection by the security inspection program is abnormal. In step 516 shown in FIG. 5, the backup control program 508 performs the same process as in the step 516 in Embodiment 1. For example, the backup control program 508 goes to step 517 to perform the former process when the value of a restoration judgment file set by the administrator device 900 through the input device 416 is "0" whereas the backup control program 508 goes to step 519 to perform the latter process when the value of the restoration judgment file is "1".

In step 517 shown in FIG. 5, the backup control program 508 generates control data 1000 in which a necessary processing command to be executed by the storage device 1400 is written, on the basis of the information of the inspection log 800 and issues the control data 1000 to the storage device 1400, in the same manner as in the step 517 in Embodiment 1.

In step 518 shown in FIG. 5, when the control data 1000 is received by the storage controller 401 of the storage device 1400, the data replication program 414 of the storage device 1400 copies data from the volume 410 to the volume 409 in the same manner as in the step 518 in Embodiment 1.

After completion of the aforementioned processing, the backup control program 508 goes back to step 512 to repeat the aforementioned procedure.

In step 519 shown in FIG. 5, the backup control program 508 performs the same process as in the step 519 in Embodiment 1.

By repeating the aforementioned processing, the storage device 1400 can achieve data restoration of the volume 409 as a subject of restoration easily and in real time on the basis of data with safety warranted.

Embodiment 4 will be described. This embodiment is configured so that an application program for performing an online backup process with warranted data matching for a database or the like operated on a host is operated by the backup control program 508. The same effect as in Embodiment 1 can be obtained. The application program is provided to achieve backup without necessity of temporary stopping of service provided by the application program per se. The application program can be achieved by an existing technique. The application program writes all data equivalent to a transaction of a database or the like, into a volume with data matching warranted and then instructs a storage device having the volume to back up the volume. In the meantime, the transaction data of the application program is temporarily stored in a memory or the like on the host on which the application program is operating, so that a necessary process can be performed continuously by the application program.

Figure 15:
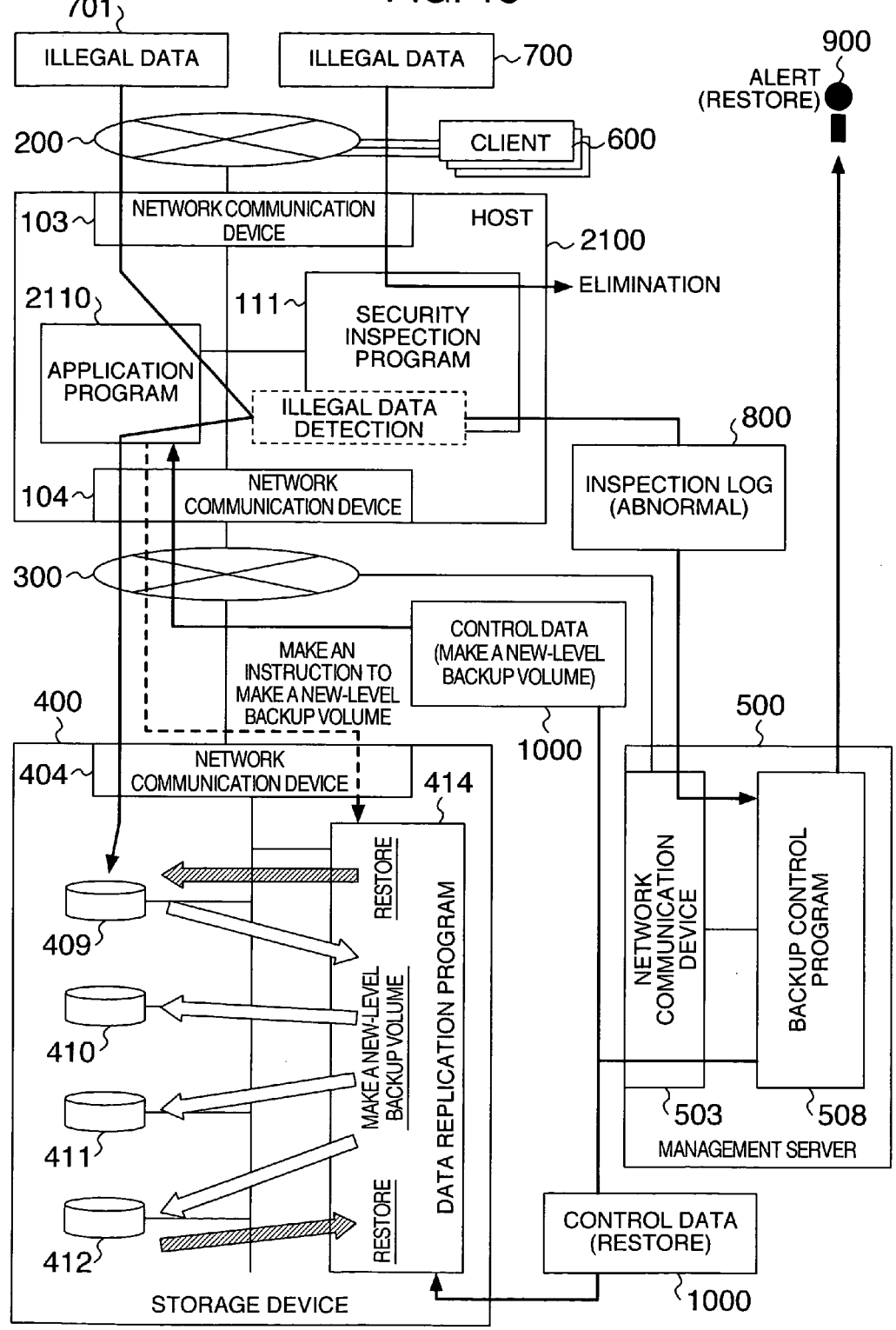
FIG. 15 is a diagram showing an example of configuration of a system.

FIG. 15 is a diagram showing the configuration of a system according to this embodiment. The system according to this embodiment comprises: a host 2100 having an application program accommodated to the online backup; a storage device 400 connected to the host 2100 through a network 300; and a management server 500 having the backup control program 508. The management server 500 performs management of copy time in the storage device 400, acquisition of volume information as a subject of copying, acquisition of a result of virus check in the host 2100, and transmission of a copy command (inclusive of a backup command and a restore command) to the host 2100.

Figure 16:
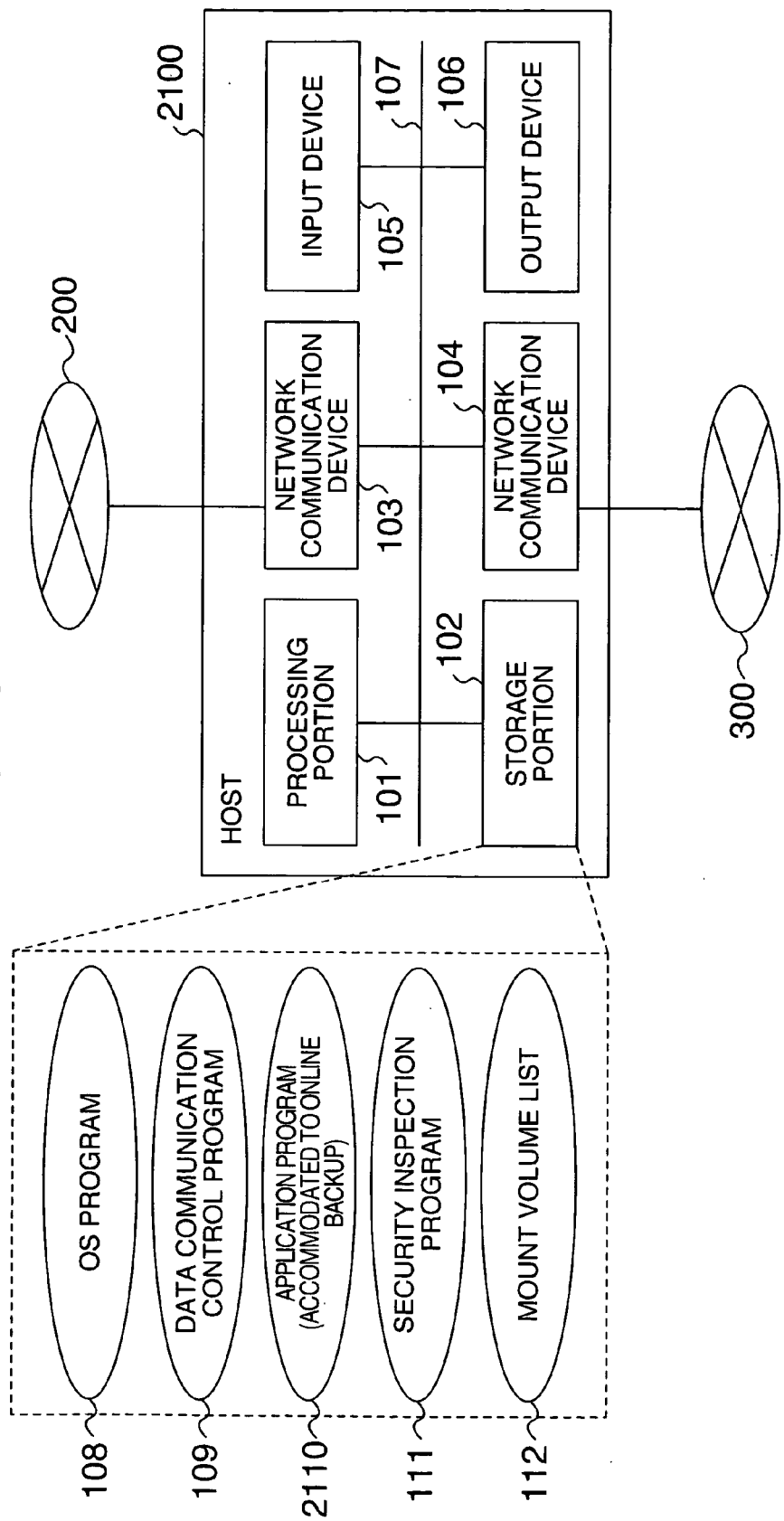
FIG. 16 is a diagram showing an example of configuration of a host.

The host in Embodiment 4 will be described. FIG. 16 shows details of the host. As described above, the host 2100 includes a processing portion 101, a storage portion 102, network communication devices 103 and 104, an input device 105, an output device 106, and a bus 107 by which the respective portions and devices 101 to 106 are connected to one another. The storage portion 102 has an OS program 108 for performing memory management, task management, etc., a data communication control program 109 for performing a process of communicating with the storage device 400, an application program 2110 such as a database operated on the OS program 108 and accommodated to the online backup, and a security inspection program 111. These programs are executed by the processing portion 101. The storage portion 102 further has a mount volume list 112. The host 2100 communicates with the storage device 400 through the network 300 by iSCSI. The data communication control program 109 performs a process concerning the iSCSI communication. The data communication control program 109 is equivalent to an iSCSI initiator (named as "iqn.a.com:hst1" in this embodiment). As described above, the OS program 108 and the application program 2110 are reading/writing data from/into the volume 409 in the storage device by iSCSI communication. The security inspection program 111 always inspects data exchanged with the client group 600 and the storage device 400 by the OS program 108 and the application program 2110. The security inspection program 111 detects writing of illegal data 701 into the volume 409 and generates an inspection log 800 in which a message of the writing of illegal data 701 is written.

An example of the procedure in the backup control program will be described below with reference to FIG. 17. In step 1511 shown in FIG. 17, the backup control program 508 acquires a mount volume list 112 from the host 2100 or the like and generates a volume list 510 for replication as shown in FIG. 6, in the same manner as in the step 511 in Embodiment 1. On this occasion, the backup control program 508 can recognize that the volume 409 connected to the host 2100 is a volume for replication to make a new-level backup volume.

Figure 17:
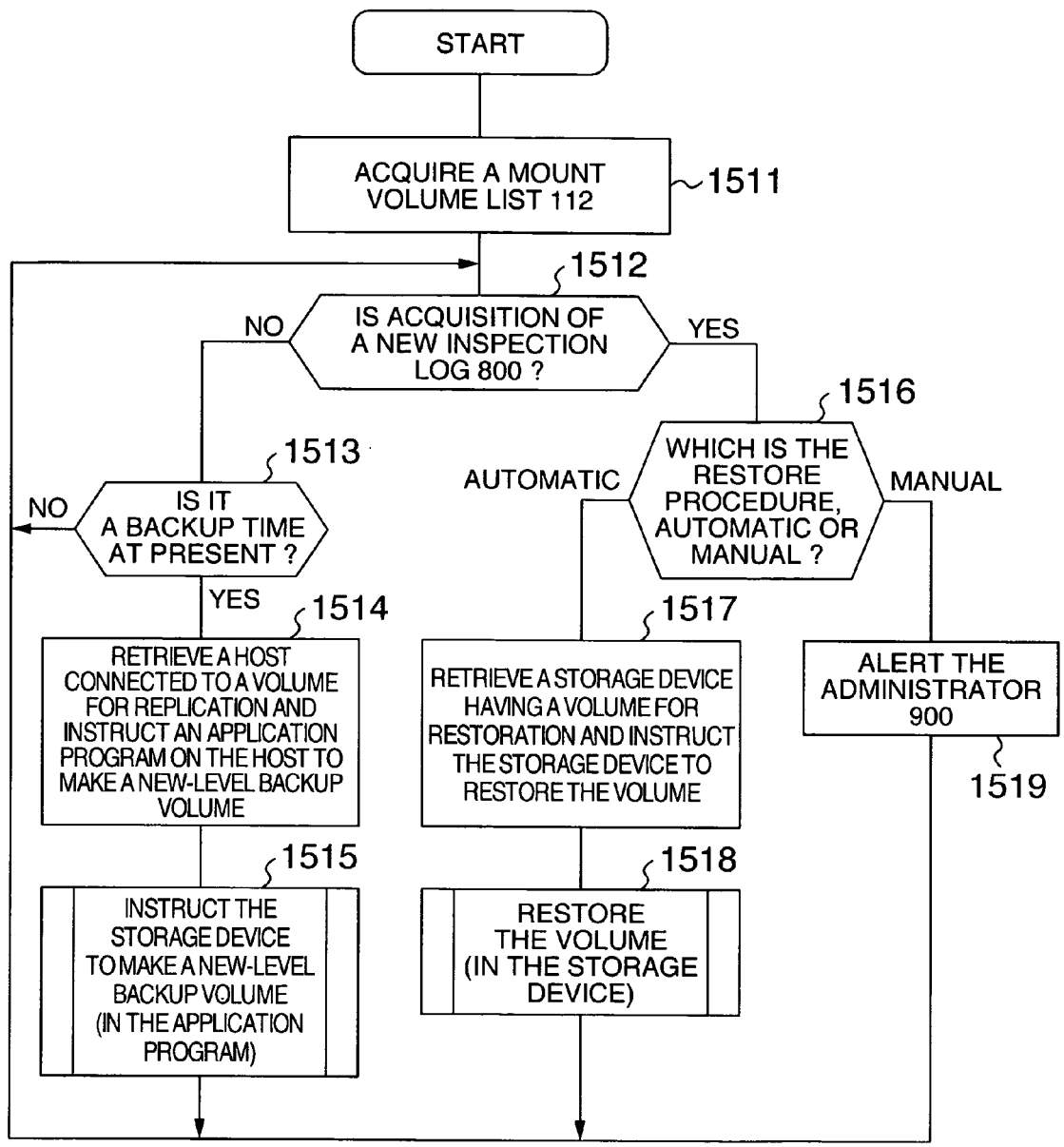
FIG. 17 is a flow chart showing an example of processing flow of a backup control program.

In step 1512 shown in FIG. 17, the backup control program 508 waits for reception of an inspection log 800 generated by the security inspection program 111, in the same manner as in the step 512 in Embodiment 1. If there is no new inspection log 800 received at the present time, the backup control program 508 goes to step 1513. If there is a new inspection log 800 received, the backup control program 508 goes to step 1516.

In step 1513 shown in FIG. 17, the backup control program 508 checks whether the present time is a backup time based on a predetermined backup period or not, in the same manner as in the step 513 in Embodiment 1. The backup control program 508 judges from the present time and the backup period information whether the present time is a backup time or not. If the present time is a backup time, the backup control program 508 goes to step 1514. Otherwise, the backup control program 508 goes back to step 1512.

In step 1514 shown in FIG. 17, the backup control program 508 generates control data 1000 in which a necessary processing command to be issued to the host is written, on the basis of the volume list 510 for replication and issues the control data 1000 to the host, in the same manner as in the step 514 in Embodiment 1. When the same process as in the step 514 in Embodiment 1 is carried out, the backup control program 508 can recognize that the destination of issuing of the control data 1000 is the host 2100.

In step 1515 shown in FIG. 17, when the control data 1000 is received by the OS program 108 or the like in the host 2100, the host 2100 instructs the application program 2110 to copy the volume on the basis of the mount volume list 112 (information on the first line shown in FIG. 6) of the host 2100 per se. At the point of time that the instruction is received, the application program 2110 writes data in progress (e.g. data included in a transaction in progress) concerning the volume as a subject of the instruction, into the volume with matching warranted and then issues a volume copy command to the storage device 400. On this occasion, the application program 2110 issues a copy command concerning the volume used by the host 2100 to the storage device 400 on the basis of the mount volume list 112. Then, the data replication program 414 of the storage device 400 copies data from the volume 409 to the volume 410 in the same manner as in the step 515 in Embodiment 1.

After completion of the aforementioned processing, the backup control program 508 goes back to step 1512 to repeat the aforementioned procedure.

By the aforementioned process, the storage device 400 can generate new-level backup volumes for the volume 409 easily and in real time while data matching is warranted and safety is warranted by the result of inspection by the security inspection program 111.

An example of the procedure concerning the backup control program will be described below in the case where the result of inspection by the security inspection program is abnormal. In step 1516 shown in FIG. 17, the backup control program 508 performs the same process as in the step 516 in Embodiment 1. For example, the backup control program 508 goes to step 1517 to perform the former process when the value of a restoration judgment file set by the administrator device 900 through the input device 105 in advance is "0" whereas the backup control program 508 goes to step 1519 to perform the latter process when the value of the restoration judgment file is "1".

In step 1517 shown in FIG. 17, the backup control program 508 generates control data 1000 in which a necessary processing command to be issued to the storage device 400 is written, on the basis of the information of the inspection log 800 and issues the control data 1000 to the storage device 400, in the same manner as in the step 517 in Embodiment 1.

In step 1518 shown in FIG. 17, when the control data 1000 is received by the storage controller 401 of the storage device 400, the data replication program 414 of the storage device 400 copies data from the volume 410 to the volume 409 in the same manner as in the step 518 in Embodiment 1.

After completion of the aforementioned processing, the backup control program 508 goes back to step 1512 to repeat the aforementioned procedure.

In step 1519 shown in FIG. 17, the backup control program 508 performs the same process as in the step 519 in Embodiment 1.

By repeating the aforementioned processing, the storage device 400 can achieve data restoration of the volume 409 as a subject of restoration easily and in real time on the basis of data with safety warranted.

Incidentally, this embodiment can be achieved also in the case where the backup control program 508 is disposed on the host 2100 or on the storage device 400 as described in Embodiment 2 or 3.

Figure 18:
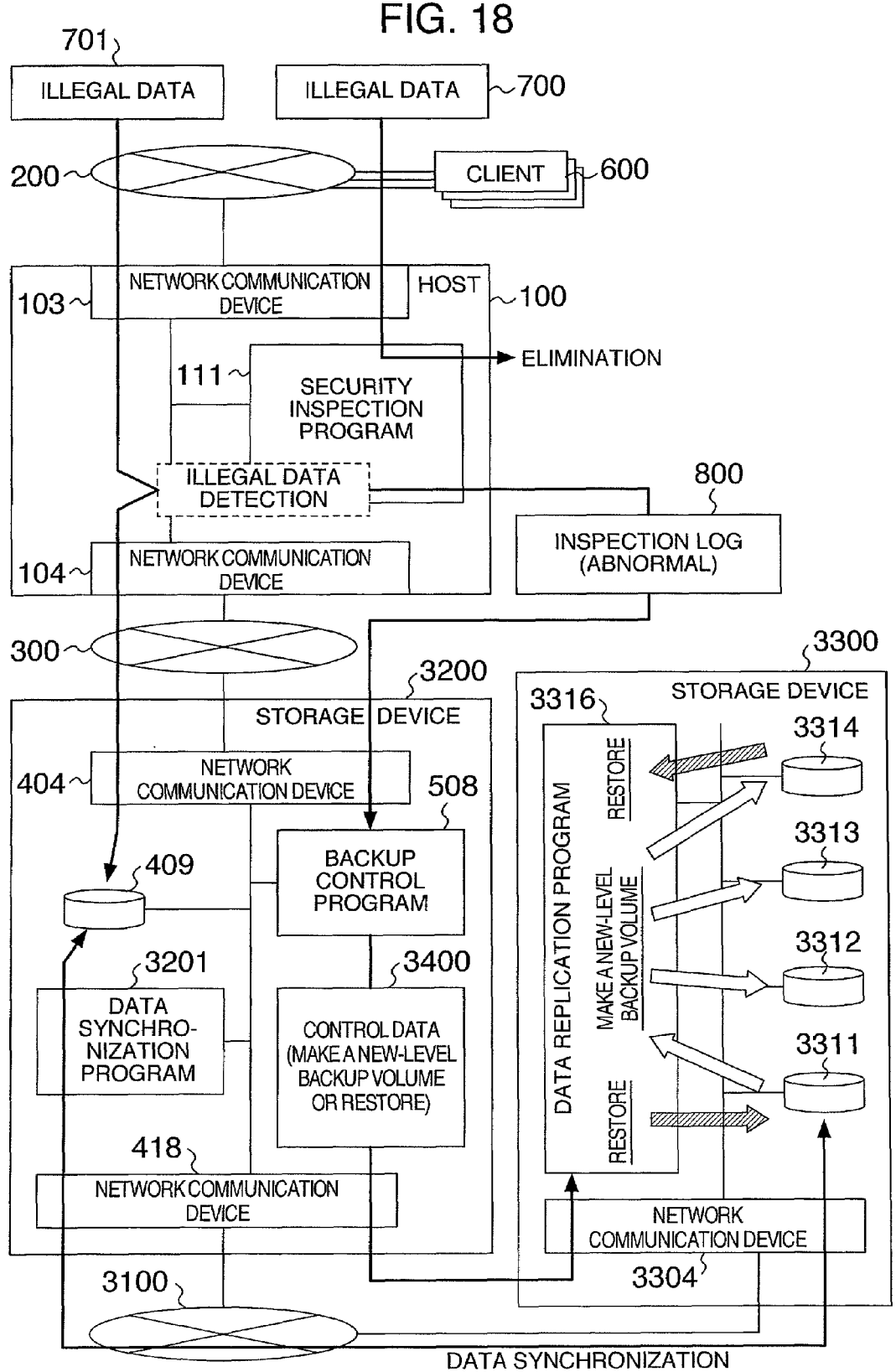
FIG. 18 is a diagram showing an example of configuration of a system.

Embodiment 5 will be described. In this embodiment, new-level backup volumes for a storage device having a volume for replication are generated in another storage device on a remote site or the like so that data can be prevented from being missing because of a disaster or the like. FIG. 18 is a diagram showing the configuration of a system according to this embodiment. The system according to this embodiment comprises a host 100, a first storage device 3200 having the backup control program 508 and connected to the host 100 through a network 300, and a second storage device 3300 arranged on a remote site or the like and connected to the first storage device 3200 through a network 3100. The first storage device 3200 performs data synchronization between a first volume of the first storage device 3200 and a second volume of the second storage device 3300, transmission of a copy command (inclusive of a backup command and a restore command) to copy data from the first volume of the first storage device 3200 to the second volume of the second storage device 3300, management of copy time in the second storage device 3300, acquisition of volume information as a subject of copying, acquisition of a result of virus check in the host 100, transmission of a copy command (inclusive of a backup command and a restore command) to copy data from the second volume of the second storage device 3300 to the first volume of the first storage device 3200, and restart of data synchronization between the first volume of the first storage device 3200 and the second volume of the second storage device 3300.

Figure 19:
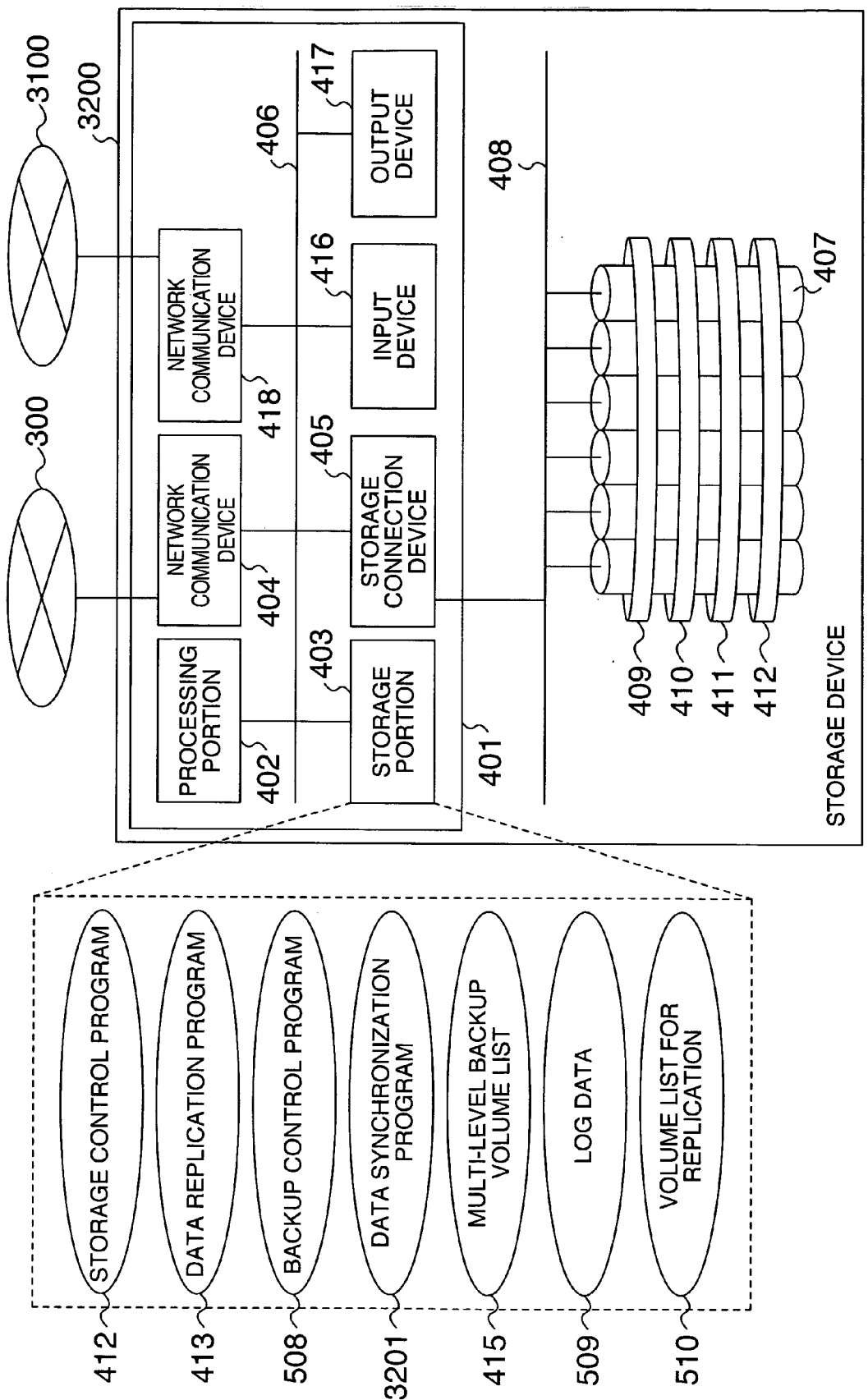
FIG. 19 is a diagram showing an example of configuration of a first storage device.

FIG. 19 shows details of the first storage device. As described above, the first storage device 3200 includes a storage controller 401. The storage controller 401 is configured to have a processing portion 402, a storage portion 403, network communication devices 404 and 418, a storage connection device 405, an input device 416, an output device 417, and a bus 406 by which the respective portions and devices 402 to 405 and 416 to 418 are connected to one another. The first storage device 3200 is configured to further include a physical disk group 407 connected to the storage controller 401 by a bus 408. The physical disk group 407 forms logical units (LUs) for storing data actually by partially combining data storage regions of physical disks. The logical units are represented by volumes 409 to 412 in FIG. 19. The storage portion 403 has a storage control program 413, a data replication program 414, a backup control program 508, and a data synchronization program 3201 for achieving data synchronization between a volume in the storage device 3200 and a volume in the storage device 3300. These programs are executed by the processing portion 402. The storage portion 403 further has a multi-level backup volume list 415, log data 509, and a volume list 510 for replication. As described above, the first storage device 3200 communicates with the host 100 (the iSCSI initiator name "iqn.a.com:hst1") by iSCSI. The OS program 108 and the application program 110 in the host 100 are reading/writing data from/into the volume 409 through the storage control program 413 which is equivalent to an iSCSI target (iqn.a.com:str1). The security inspection program 111 always inspect data exchanged with the client group 600 and the first storage device 3200 by the OS program 108 and the application program 110. The security inspection program 111 detects writing of illegal data 701 into the volume 409 and generates an inspection log 800 in which a message of the writing of illegal data 701 is written. The storage control program 413 performs a process equivalent to an iSCSI initiator (named as "iqn.a.com:str1.Ini" in this embodiment) in order to communicate with the second storage device 3300 which will be described later through the network 3100 by iSCSI.

Figure 20:
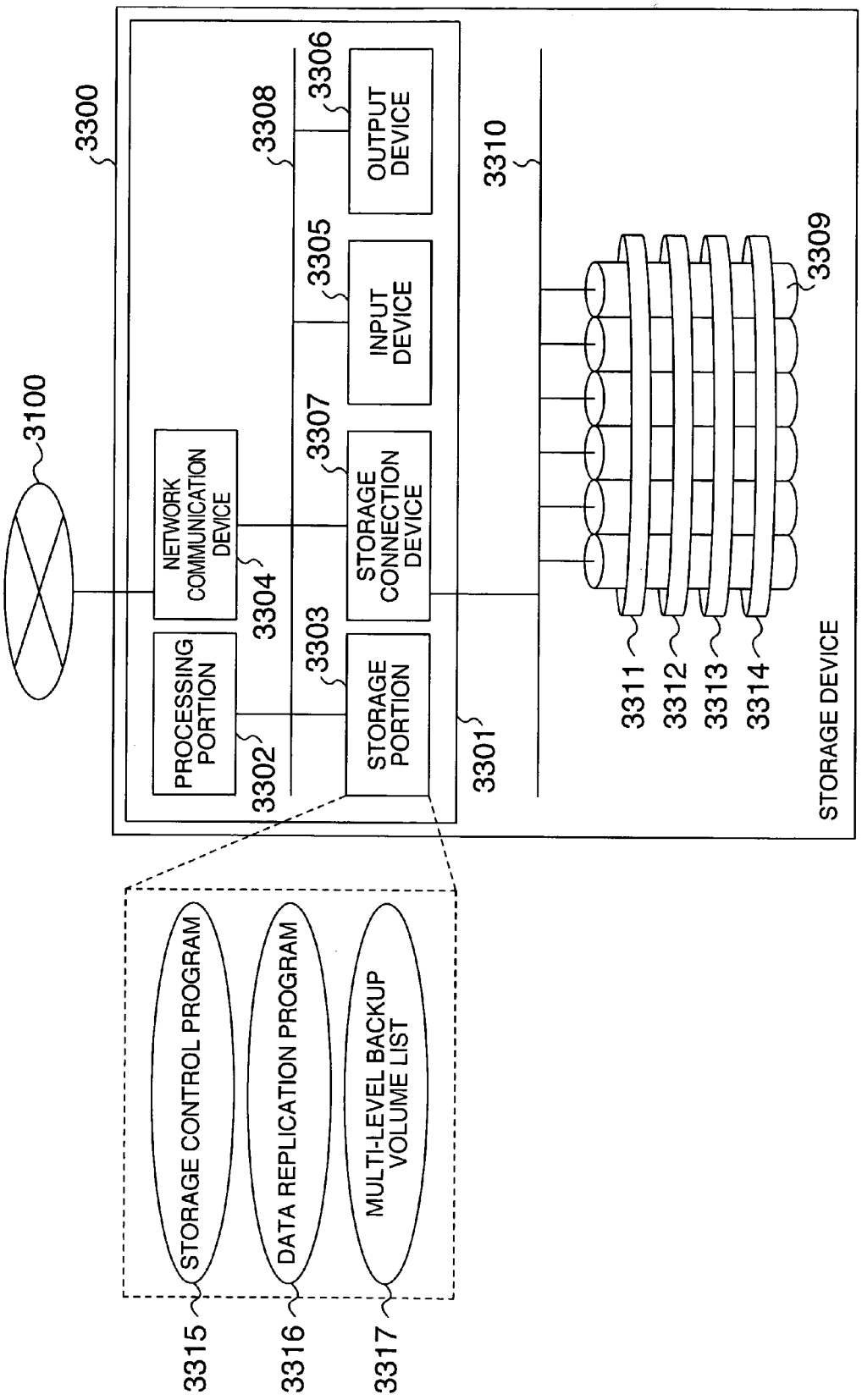
FIG. 20 is a diagram showing an example of configuration of a second storage device.

FIG. 20 shows details of the second storage device. The second storage device 3300 includes a storage controller 3301 for controlling the storage device 3300 as a whole. The storage controller 3301 has: a processing portion 3302 having a CPU, etc; a storage portion 3303 having a storage device such as an RAM; a network communication device 3304; an input device 3305 for inputting data from an input device such as a keyboard; an output device 3306 for outputting data to an output device such as a display; a storage connection device 3307; and a bus 3308 by which the respective portions and devices 3302 to 3307 are connected to one another. The second storage device 3300 further includes a physical disk group 3309 connected to the storage controller 3301 by a bus 3310. The physical disk group 3309 forms logical units (LUs) for storing data actually by partially combining data storage regions of physical disks. The logical units are represented by volumes 3311 to 3314 in FIG. 20. The storage portion 3303 has: a storage control program 3315 for managing access to the volumes 3311 to 3314; and a data replication program 3316 for copying data from one volume to another volume. These programs are executed by the processing portion 3302. The storage portion 3303 further has a multi-level backup volume list 3317 for storing log information processed by the data replication program 3316. The second storage device 3300 is physically connected to the network 3100 by the network communication device 3304, so that a network communication process concerning the second storage device 3300 is carried out on the basis of a communication protocol of the network 3100. For example, the communication protocol is IP. The second storage device 3300 communicates with the first storage device 3200 by iSCSI. The storage control program 315 is equivalent to an iSCSI target (named as "iqn.a.com:str2 in the embodiment) for carrying out the process concerning the iSCSI communication, and communicated with the first storage device 3200 through the network communication device 3304. Incidentally, it is assumed now that LUN=0, 1, 2, 3 are allocated to the volumes 3311 to 3314.

As described above, in this embodiment, a new-level backup volume for a storage device having a volume for replication is generated in another volume of another storage device on a remote site or the like so that data can be prevented from being missing because of a disaster or the like. Therefore, description will be made on the assumption that the volume for replication is the volume 409 of the first storage device 3200 while another storage device on a remote site or the like is the second storage device 3300.

First, the first storage device 3200 performs data synchronization between the volume 409 of the first storage device 3200 and the volume 3311 of the second storage device 3300. In the first storage device 3200, the data synchronization is executed by the data synchronization program 3201 so that the state of data in the volume 409 and the state of data in the volume 3311 are kept equal to each other. Specifically, the first storage device 3200 uses the iSCSI initiator "iqn.a.com:str1.Ini" to connect the iSCSI initiator to the iSCSI target "iqn.a.com:str2" of the second storage device 3300 and performs data synchronization for the volume 3311 connectable in the iSCSI target. The data synchronization can be achieved by an existing technique.

An example of the procedure in the backup control program will be described below with reference to FIG. 21. In step 2511 shown in FIG. 21, the backup control program 508 acquires a mount volume list 112 from the host 100 or the like and generates a volume list 510 for replication as shown in FIG. 6, in the same manner as in the step 511 in Embodiment 1. On this occasion, the backup control program 508 can recognize that the volume 409 connected to the host 100 is a volume for replication to make a new-level backup volume.

Figure 21:
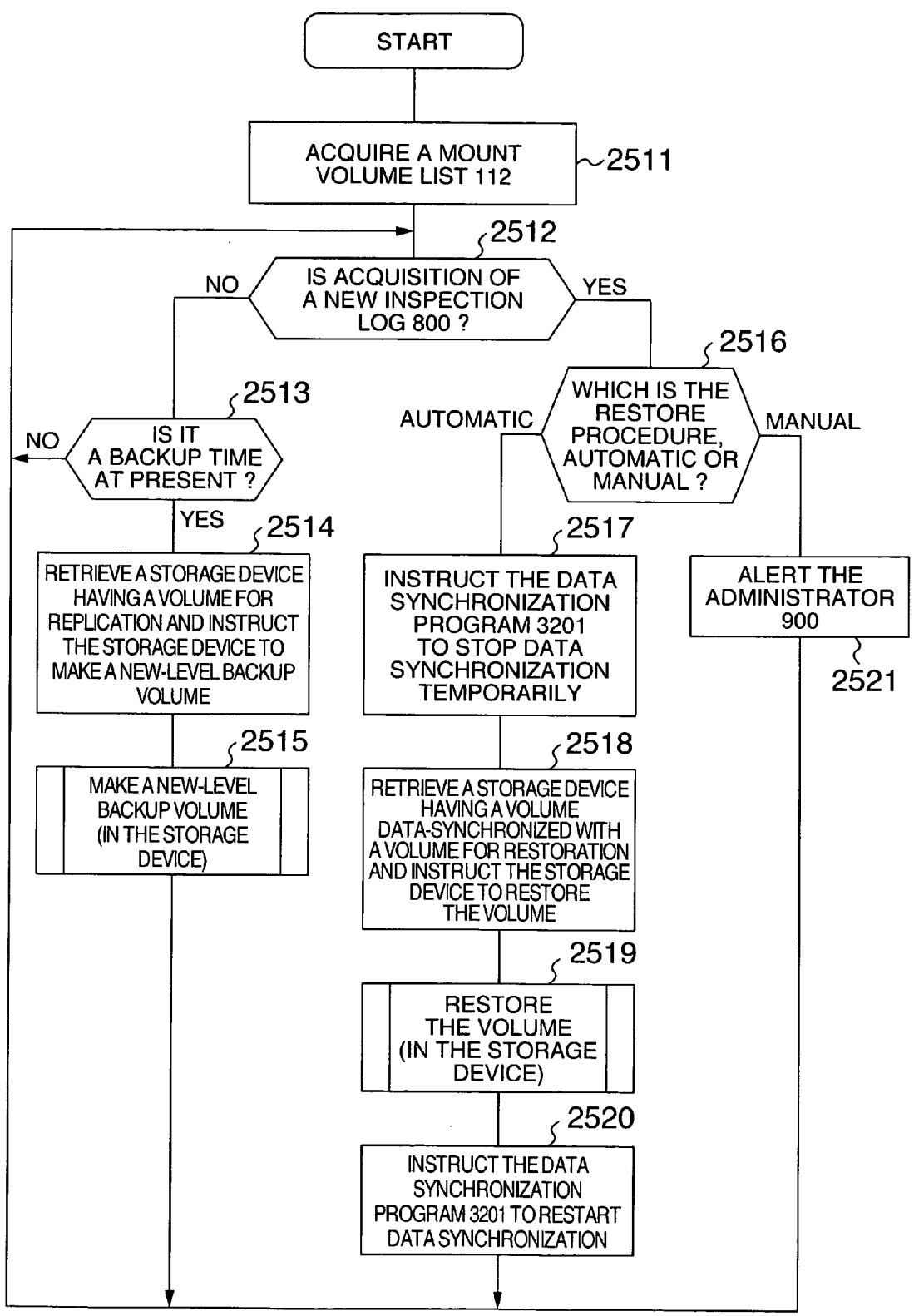
FIG. 21 is a flow chart showing an example of processing flow of a backup control program.

In step 2512 shown in FIG. 21, the backup control program 508 waits for reception of an inspection log 800 generated by the security inspection program 111, in the same manner as in the step 512 in Embodiment 1. If there is no new inspection log 800 received at the present time, the backup control program 508 goes to step 2513. If there is a new inspection log 800 received, the backup control program 508 goes to step 2516.

In step 2513 shown in FIG. 21, the backup control program 508 checks whether the present time is a backup time based on a predetermined backup period or not, in the same manner as in the step 513 in Embodiment 1. The administrator 900 (not shown in FIG. 18) can set the backup period by using the input device 416. The backup control program 508 judges from the present time and the backup period information whether the present time is a backup time or not. If the present time is a backup time, the backup control program 508 goes to step 2514. Otherwise, the backup control program 508 goes back to step 2512.

In step 2514 shown in FIG. 21, the backup control program 508 generates control data 3400 in which a necessary processing command to be executed by the first storage device 3200 is written, on the basis of the information of the volume list 510 for replication and issues control data 3400, in the same manner as in the step 514 in Embodiment 1. On this occasion, the volume 409 in the first storage device 3200 is data-synchronized with the volume in the other (second) storage device. Therefore, the backup control program 508 issues the control data 3400 to the storage device having the volume. As described above, on this occasion, the data synchronization program 3201 performs data synchronization between the volume 409 and the volume 3311 in the second storage device 3300. Accordingly, the data synchronization program 3201 can make the first storage device 3200 recognize that the volume for replication is the volume 3311 in the second storage device 3300. For example, the format of the control data 3400 is the same as in FIG. 7. The control data 3400 includes information such as the iSCSI target name "iqn.a-.com:str2" and LUN=0 for indicating the volume 3311, and the content of processing "make a new-level backup volume". The control data 3400 is issued to the second storage device 3300.

In step 2515 shown in FIG. 21, when the control data 3400 is received by the storage controller 3301 of the storage device 3300, the data replication program 3316 of the storage device 3300 copies data from the volume 3311 to the volume 3312 in the same manner as in the step 515 in Embodiment 1. The data replication program 3316 generates a multi-level backup volume list 3317 which is log information of volume copying as shown in FIG. 22.

After completion of the aforementioned processing, the backup control program 508 goes back to step 2512 to repeat the aforementioned procedure.

By the aforementioned process, the first storage device 3200 can generate new-level backup volumes for the volume 409 in the other storage device on a remote site or the like easily and in real time while safety is warranted by the result of inspection by the security inspection program 111.

An example of the procedure concerning the backup control program will be described below in the case where the result of inspection by the security inspection program is abnormal. In step 2516 shown in FIG. 21, the backup control program 508 performs the same process as in the step 516 in Embodiment 1. For example, the backup control program 508 goes to step 2517 to perform the former process when the value of a restoration judgment file set by the administrator device 900 through the input device 416 in advance is "0" whereas the backup control program 508 goes to step 2519 to perform the latter process when the value of the restoration judgment file is "1".

In step 2517 shown in FIG. 21, the backup control program 508 temporarily stops the data synchronization which is performed between the volume 409 and the volume 3311 by the data synchronization program 3201.

In step 2518 shown in FIG. 21, the backup control program 508 generates control data 3400 in which a necessary processing command to be executed by the first storage device 3200 is written, on the basis of the information of the inspection log 800 and issues the control data 3400, in the same manner as in the step 517 in Embodiment 1. As described above, the volume 409 in the first storage device 3200 is data-synchronized with the volume in the other (second) storage device. Therefore, the backup control program 508 generates control data 3400 by the aforementioned process and issues the control data 3400 to the second storage device 3300. For example, the format of the control data 3400 is the same as shown in FIG. 10.

In step 2519 shown in FIG. 21, when the control data 3400 is received by the storage controller 3301 of the second storage device 3300, the data replication program 3316 of the second storage device 3300 copies data from the volume 3314 to the volume 3311 in the same manner as in the step 518 in Embodiment 1.

In step 2520 shown in FIG. 21, the backup control program 508 restarts the data synchronization which is performed between the volume 409 and the volume 3311 by the data synchronization program 3201 and which has been temporarily stopped in the step 2517. On this occasion, the storage controller 401 of the first storage device 3200 performs a process of copying data from the volume 3311 in the second storage device 3300 to the volume 409 in the first storage device 3200 in advance. This process can be achieved in such a manner that data is read from the volume 3311 by an iSCSI initiator process executed by the storage control program 413. As a result, data in the volume 409 is rewritten to safe data restored by the step 2519.

After completion of the aforementioned processing, the backup control program 508 goes back to step 2512 to repeat the aforementioned procedure.

In step 2521 shown in FIG. 21, the backup control program 508 performs the same process as in the step 519 in Embodiment 1.

By repeating the aforementioned processing, the first storage device 3200 can achieve data restoration of the volume 409 as a subject of restoration easily and in real time on the basis of data with safety warranted.

Incidentally, this embodiment can be achieved also in the case where the backup control program 508 is disposed on the management server 500 or on the host 100 as described in Embodiment 1 or 2. Incidentally, in this case, the backup control program 508 needs to be allowed to communicate with the second storage device 3300 through the network 3100 or the like. Although the embodiments have been described on the case where new-level backup volumes are generated, it is a matter of course that the invention can be applied to the case where one new-level backup volume, that is, a replicated volume is generated.

A further embodiment of the invention is a storage network system in which the host has second copy command issuing means for issuing a copy command to a storage device having an abnormal volume so that data can be copied from another volume which was copied on the basis of a copy command issued by the copy command issuing means, to the abnormal volume when the content of the inspection log acquired by the inspection log acquiring means is abnormal.

In the network storage system, the host may further have administrator alert means for alerting the administrator of the storage device having the abnormal volume when the content of the inspection log acquired by the inspection log acquiring means is abnormal.

A further embodiment of the invention is a storage network system comprising: a storage device including volumes for recording data, and network communication means; a host including means of reading/writing data from/into the volumes through a network; and a management server including means of connecting the storage device and the host to each other through a network, wherein the management server includes: copy time management means for managing the time of issuing a copy command to copy data from the volume to another volume; mount information acquisition means for acquiring mount information concerning volumes in the storage device to which the host is connected at present; a security inspection program for performing security inspection of data communicated by the host through the network and generating an inspection log inclusive of a result of the security inspection; inspection log acquisition means for acquiring the inspection log generated by the security inspection program whenever occasion demands; storage-specified copy command issuing means for specifying a storage device having a volume included in the mount information acquired by the mount information acquisition means and having no abnormality detected, and issuing a command to the specified storage device to copy data from the volume to another volume; second storage-specified copy command issuing means for specifying a storage device having a volume included in the mount information acquired by the mount information acquisition means and having abnormality detected when the content of the inspection log concerning the volume includes abnormality at the time at which a command to copy data from the volume to the other volume is issued, and issuing a command to the specified storage device to copy data from the other volume to the volume, the other volume storing data which was copied by the copy command issued by the storage-specified copy command issuing means in the past.

A further embodiment of the invention is a storage network system comprising: a storage device including volumes for recording data, and network communication means; and a host including means of reading/writing data from/into the volumes through a network, wherein the host includes a security inspection program, copy time management means, mount information acquisition means, inspection log acquisition means, storage-specified copy command issuing means, and second storage-specified copy command issuing means.

In the storage network system comprising: a storage device including volumes for recording data, and network communication means; and a host including means of reading/writing data from/into the volumes of the storage device through a network, the storage device may include copy time management means, mount information acquisition means, inspection log acquisition means, storage-specified copy command issuing means, and second storage-specified copy command issuing means.

A further embodiment of the invention is a storage network system comprising: a storage device including volumes for recording data, and network communication means; a host including means of reading/writing data from/into the volumes of the storage device through a network; and a management server including means of being connected to the storage device and the host through a network, wherein the management server includes: copy time management means; mount information acquisition means; inspection log acquisition means; host-specified copy command issuing means for specifying a host using a volume included in the mount information acquired by the mount information acquisition means and having no abnormality detected and issuing a command to the application program of the specified host to copy data from the volume to another volume when the content of the inspection log concerning the host includes no abnormality at the time when a command is issued to the application program of the host to copy data from the volume to the other volume; and second host-specified copy command issuing means for specifying a host using a volume included in the mount information acquired by the mount information acquisition means and having abnormality detected and issuing a command to the application program of the specified host to copy data from the other volume to the volume when the content of the inspection log concerning the host includes abnormality, the other volume storing data which was copied by the copy command issued by the host-specified copy command issuing mean in the past.

A further embodiment of the invention is a storage network system comprising: a storage device including volumes for recording data, and network connection means; and a host including means of reading/writing data from/into the volumes of the storage device through a network, and an application program having a function for issuing a command to copy data from a volume of the storage device to another volume, wherein the host includes: a security inspection program; copy time management means; mount information acquisition means; inspection log acquisition means; host copy command issuing means for issuing a command to the application program using a volume included in the mount information acquired by the mount information acquisition means and having no abnormality detected to copy data from the volume to another volume when the content of the inspection log concerning the host includes no abnormality at the time at which the command is issued to the application program to copy data from the volume to the other volume; and second host copy command issuing mean for issuing a command to the application program using a volume included in the mount information acquired by the mount information acquisition means and having abnormality detected to copy data from the other volume to the volume when the content of the inspection log concerning the host includes abnormality, the other volume storing data which was copied by the copy command issued by the host copy command issuing means in the past.

In the storage network system comprising: a storage device including volumes for recording data, and network connection means; and a host including means of reading/writing data from/into the volumes of the storage device through a network, and an application program having a function for issuing a command to copy data from a volume of the storage device to another volume, the storage device may include copy time management means, mount information acquisition means, inspection log acquisition means, host-specified copy command issuing means, and second host-specified copy command issuing means.

A further embodiment of the invention is a storage network system comprising: a first storage device including volumes for recording data, and network connection mean; a host including means of reading/writing data from/into the volumes of the first storage device through a network; a second storage device including volumes for recording data, and network connection means and connected to the first storage device; and a management server including means of being connected to the first and second storage devices and the host through a network, wherein the first storage device includes means for performing data synchronization between a first volume of the first storage device and a second volume of the second storage device, wherein the host includes a security inspection program for performing security inspection of data communicated through the network, and an application program having a function of issuing a command to copy data from the first volume of the first storage device to the second volume of the second storage device, wherein the management server includes second copy time management means for managing the time at which a command to copy data from the second volume of the second storage device to another volume is issued, mount information acquisition means, inspection log acquisition means, second storage-specified copy command issuing means for specifying the first storage device having a volume included in the mount information acquired by the mount information acquisition means and having no abnormality detected and issuing a command to the second storage device having a second volume data-synchronized with the first volume to copy data from the second volume to another volume when the content of the inspection log concerning the volume includes no abnormality at the time at which a copy command is issued by management of the second copy time management means, synchronization restart means for specifying the first storage device having the first volume included in the mount information acquired by the mount information acquisition means and having abnormality detected in the inspection log, temporarily stopping the data synchronization executed between the first volume and the second volume by the first storage device, issuing a command to the second storage device having the second volume data-synchronized with the first volume to copy data from the other volume copied by the copy command issued by the second storage-specified copy command issuing means in the past to the second volume, and issuing a command to the first storage device to restart the data synchronization between the first volume and the second volume.

In the storage network system, the management server may include: second copy time management means for managing the time at which a command to copy data from the second volume of the second storage device to another volume; mount information acquisition means; inspection log acquisition means; second storage-specified copy command issuing means for specifying the first storage device having a volume included in the mount information acquired by the mount information acquisition means and having no abnormality detected, and issuing a command to the second storage device having the second volume data-synchronized with the first volume to copy data from the second volume to another volume when the content of the inspection log concerning the volume includes no abnormality at the time at which a copy command is issued by management of the second copy time management means; and synchronization restart means for specifying the first storage device having the first volume included in the mount information acquired by the mount information acquisition means and having abnormality detected in the inspection log, temporarily stopping the data synchronization executed between the first volume and the second volume by the first storage device, issuing a command to the second storage device having the second volume data-synchronized with the first volume to copy data from the other volume copied by the copy command issued by the second storage-specified copy command issuing means in the past to the second volume, and issuing a command to the first storage device to restart the data synchronization between the first volume and the second volume.

A further embodiment of the invention is a storage network system comprising: a first storage device including volumes for recording data, and network connection means; a host including means of reading/writing data from/into the volumes of the first storage device through a network; and a second storage device including volumes for recording data, and network connection means and connected to the first storage device, wherein the first storage device includes: means for performing data synchronization between a first volume of the first storage device and a second volume of the second storage device; an application program having a function of issuing a command to copy data from the first volume to the second volume of the second storage device; second copy time management means for managing the time at which a command to copy data from the second volume of the second storage device to another volume is issued; mount information acquisition means; inspection log acquisition means; third storage-specified copy command issuing means for specifying a volume included in the mount information acquired by the mount information acquisition means and having no abnormality detected and issuing a command to the second storage device having the second volume data-synchronized with the first volume to copy data from the second volume to another volume when the content of the inspection log concerning the volume includes no abnormality at the time at which a copy command is issued by management of the second copy time management means; and second synchronization restart command issuing means for specifying the first volume included in the mount information acquired by the mount information acquisition means and having abnormality detected in the inspection log, temporarily stopping the data synchronization between the first volume and the second volume, issuing a command to the second storage device having the second volume data-synchronized with the first volume to copy data from the other volume copied by the copy command issued by the third storage-specified copy command issuing means in the past to the second volume, and issuing a command to restart the data synchronization between the first volume and the second volume.

A further embodiment of the invention is a storage network system comprising: a first storage device including volumes for recording data, and network connection means; a host including means of reading/writing data from/into the volumes of the first storage device through a network; and a second storage device including volumes for recording data, and network connection means and connected to the first storage device, wherein the host includes: a security inspection program for performing security inspection of data communicated through the network; an application program having a function of issuing a command to copy data from a first volume of the first storage device to a second volume of the second storage device; second copy time management means for managing the time at which a command to copy data from the second volume of the second storage device to another volume is issued; mount information acquisition means; inspection log acquisition means; second storage-specified copy command issuing means for specifying the first storage device having a volume included in the mount information acquired by the mount information acquisition means and having no abnormality detected, and issuing a command to the second storage device having the second volume data-synchronized with the first volume to copy data from the second volume to another volume when the content of the inspection log concerning the volume includes no abnormality at the time at which a copy command is issued by management of the second copy time management means; and synchronization restart command issuing means for specifying the first storage device having the first volume included in the mount information acquired by the mount information acquisition means and having no abnormality detected in the inspection log, temporarily stopping the data synchronization executed between the first volume and the second volume by the first storage device, issuing a command to the second storage device having the second volume data-synchronized with the first volume to copy data from the other volume copied by the copy command issued by the second storage-specified copy command issuing means in the past to the second volume, and issuing a command to the first storage device to restart the data synchronization between the first volume and the second volume.

A further embodiment of the invention is a storage network system comprising: a storage device including volumes for recording data, and network connection means; a host including means of reading/writing data from/into the volumes through a network; and a management server including means of being connected to the storage device and the host through a network, wherein the host includes: a processing portion; a storage portion having a data communication control program, and a security inspection program for performing security inspection of data communicated through the network and generating an inspection log inclusive of a result of the security inspection; a network communication device, an input device, an output device, and a bus by which the respective portions and devices of the host are connected to one another, wherein the storage device includes a storage controller, a physical disk group, and a bus by which the storage controller and the physical disk group are connected to each other, the storage controller having: a processing portion; a storage portion having a storage control program, and a data replication program; a network communication device; and a storage connection device, and wherein the management server includes: a processing portion; a storage portion having a backup control program; a network communication device; an input device; an output device; and a bus by which the respective portions and devices of the management server are connected to one another.

Copying of a safe volume without wider-range illegal data not only inclusive of viruses and worms but also inclusive of falsification and illegal interpolation of data such as Web contents can be achieved speedily and easily. In addition, because the administrator's labor required for copying a safe volume or restoring a volume to the safe volume can be reduced greatly, highly reliable service can be provided while the continuity of the service is not spoiled.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A system comprising:
   a storage device including volumes for recording data, and a network connection portion;
   a first computer for reading/writing data from/into the volumes through a network;
   a network for connecting the storage device and the first computer to each other; and
   a second computer connected to the network,
   wherein the first computer inspects the content of access to the storage device to detect illegal data, collects an inspection log as a result of detection of data indicating abnormality under the inspection and sends the inspection log to the second computer at predetermined timing,
   wherein, when the second computer receives no inspection log, the second computer sends a copy command to the storage device through the network to copy data from one volume of the storage device to another volume of the storage device, and the storage device copies data from the volume to the other volume on the basis of the command given by the second computer,
   wherein, when the second computer receives the inspection log, the second computer sends another copy command to the storage device through the network to restore data to another volume of the storage device by referring to a back-up volume list, and the storage device restores data from the volume to another volume on the basis of the back-up volume list, and
   wherein, when the second computer receives the inspection log, the storage device restores data latest in back-up time from the volume to said another volume by referring to the back-up volume list.

2. The system according to claim 1, wherein when the inspection log includes illegal data indicating abnormality of the content of access, the second computer stops issuing of the command.

3. The system according to claim 2, wherein the abnormality means the case where a computer virus is present in the content of access, and wherein the second computer stops issuing of the command when the inspection log includes illegal data indicating the presence of the computer virus.

4. The system according to claim 2, wherein the second computer issues a second command to rewrite data stored in the volume with data stored in a third volume of the storage device when the inspection log includes illegal data indicating the abnormality, and wherein the storage device overwrite data stored in the volume with data stored in the third volume when the second command is received.

5. The system according to claim 4, wherein data stored in the third volume is data which was stored the volume in the past.

6. The system according to claim 5, wherein the second computer alerts a system administrator to the presence of the computer virus when the inspection log includes illegal data indicating the abnormality.

7. The system according to claim 6, wherein when the inspection log includes no abnormality, the second computer sends the command to the storage device periodically.

8. The system according to claim 1, wherein the predetermined timing is a point of time when the first computer detected abnormality in the content of access.

9. The system according to claim 1, wherein the first computer and the second computer are included in one apparatus.

10. The system according to claim 1, wherein the second computer and the storage device are included in one apparatus.

11. The system according to claim 1, wherein the second computer specifies the volume as a subject of the access processing and instructs the storage device to copy data from the volume to the other volume.

12. The system according to claim 1, wherein the network, the first computer and the storage device perform data transfer according to an iSCSI protocol.

13. A computer connected to a storage device through a network, comprising:
   an interface connected to the network;
   a control portion; and
   a storage portion,
   wherein the control portion receives information of the content of access to the storage device through the network to detect illegal data and receives an inspection log as a result of detection of data indicating abnormality under the inspection, and sends a copy command to the storage device on the basis of the information of access in the inspection log to restore data to another volume of the storage device by referring to a back-up volume list, and the storage device restores data from the volume to another volume on the basis of the back-up volume list, and otherwise sends a command in the absence of receiving the inspection log to copy data from a volume of the storage device to another volume of the storage device, and
   wherein, when the control portion receives the inspection log, the storage device restores data latest in back-up time from the volume to said another volume by referring to the back-up volume list.

14. The computer according to claim 13, wherein when the information of the content of access includes information indicating abnormality, the control portion stops transmission of the command.

15. The computer according to claim 14, wherein when the information of the content of access includes information indicating abnormality, the control portion sends a command to the storage device to copy data from a third volume to the other volume, the third volume included in the storage device and storing data which was stored in the volume in the past.

16. A system comprising:
   a storage device including volumes for recording data, and a network connection portion;
   a first computer for reading/writing data from/into the volumes through a network;
   a network for connecting the storage device and the first computer to each other; and
   a second computer connected to the network,
   wherein the first computer inspects the content of data access to the storage device to detect illegal data, collects an inspection log as a result of detection of data indicating abnormality under the inspection and sends the inspection log to the second computer at predetermined timing,
   wherein, when the second computer receives no inspection log, the second computer sends a command to the storage device through the network to copy data from a volume of the storage device to another volume of the storage device, and the storage device copies data from the volume to the other volume on the basis of the command given by the second computer, and wherein, when the second computer receives the inspection log, the second computer sends another copy command to the storage device through the network to restore data to another volume of the storage device by referring to a back-up volume list, and the storage device restores data from the volume to another volume on the basis of the back-up volume list, wherein, when the inspection log includes data indicating abnormality in the content of access, the second computer stops issuing of the command, wherein, when the inspection log includes data indicating the abnormality, the second computer issues a second command to rewrite data stored in the volume with data stored in a third volume of the storage device, wherein the storage device overwrites data stored in the volume with data stored in the third volume when the second command is received, wherein the data stored in the third volume is data which was stored in the volume in the past, and wherein, when the second computer receives the inspection log, the storage device restores data latest in back-up time from the volume to said another volume by referring to the back-up volume list.

* * * * *